(12) United States Patent
Yoshida et al.

(10) Patent No.: US 10,321,087 B2
(45) Date of Patent: Jun. 11, 2019

(54) SOLID-STATE IMAGE SENSOR AND IMAGE SENSING SYSTEM

(71) Applicant: CANON KABUSHIKI KAISHA, Tokyo (JP)

(72) Inventors: Daisuke Yoshida, Ebina (JP); Yasushi Matsuno, Fujisawa (JP); Hirofumi Totsuka, Fujisawa (JP); Takashi Muto, Kawasaki (JP); Masahiro Kobayashi, Tokyo (JP); Toru Koizumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 15/834,293

(22) Filed: Dec. 7, 2017

(65) Prior Publication Data

US 2018/0098013 A1    Apr. 5, 2018

Related U.S. Application Data

(63) Continuation of application No. 14/662,604, filed on Mar. 19, 2015, now Pat. No. 9,876,975.

(30) Foreign Application Priority Data

Mar. 27, 2014  (JP) ................................ 2014-066812
Dec. 26, 2014  (JP) ................................ 2014-265780

(51) Int. Cl.
*H04N 5/378* (2011.01)
*H04N 5/3745* (2011.01)

(52) U.S. Cl.
CPC ........... *H04N 5/378* (2013.01); *H04N 5/3745* (2013.01)

(58) Field of Classification Search
CPC .... H04N 5/3355; H04N 5/374; H04N 5/3742; H04N 5/3745; H04N 5/37; H01L 27/14603; H01L 27/14609
See application file for complete search history.

(56) References Cited

U.S. PATENT DOCUMENTS 5,698,892 A   12/1997  Koizumi et al.
5,917,547 A    6/1999  Merrill et al.
(Continued)

FOREIGN PATENT DOCUMENTS

CN   203103304 U   7/2013
CN   103548335 A   1/2014
(Continued)

OTHER PUBLICATIONS

U.S. Appl. No. 15/237,272, filed Aug. 15, 2016.
(Continued)

*Primary Examiner* — Mekonnen D Dagnew
(74) *Attorney, Agent, or Firm* — Venable LLP

(57) ABSTRACT

A sensor has an image sensing unit including pixel blocks, and a readout unit for reading out a signal from the image sensing unit. The pixel block includes a photoelectric converter, first and second transistors, and a current source. First main electrodes of the first and second transistors are connected to a common node, and the current source is provided between the common node and a predetermined voltage. A signal readout operation includes an operation in which a voltage corresponding to charges in the photoelectric converter is supplied to a control electrode of the first transistor, and a temporally changing reference voltage is supplied to a control electrode of the second transistor. The readout unit reads out a signal from the image sensing unit via a second main electrode of the first transistor.

13 Claims, 23 Drawing Sheets

(56) References Cited

U.S. PATENT DOCUMENTS

| | | |
|---|---|---|
| 6,188,094 B1 | 2/2001 | Kochi et al. |
| 6,265,941 B1 | 7/2001 | Lopata |
| 6,271,785 B1 | 8/2001 | Martin et al. |
| 6,518,910 B2 | 2/2003 | Sakuragi et al. |
| 6,670,990 B1 | 12/2003 | Kochi et al. |
| 6,960,751 B2 | 11/2005 | Hiyama et al. |
| 7,016,089 B2 | 3/2006 | Yoneda et al. |
| 7,110,030 B1 | 9/2006 | Kochi et al. |
| 7,227,208 B2 | 6/2007 | Ogura et al. |
| 7,321,110 B2 | 1/2008 | Okita et al. |
| 7,324,144 B1 | 1/2008 | Koizumi |
| 7,348,615 B2 | 3/2008 | Koizumi |
| 7,408,210 B2 | 8/2008 | Ogura et al. |
| 7,429,764 B2 | 9/2008 | Koizumi et al. |
| 7,460,162 B2 | 12/2008 | Koizumi et al. |
| 7,462,810 B2 | 12/2008 | Kobayashi et al. |
| 7,466,003 B2 | 12/2008 | Ueno et al. |
| 7,538,810 B2 | 5/2009 | Koizumi et al. |
| 7,550,793 B2 | 6/2009 | Itano et al. |
| 7,554,591 B2 | 6/2009 | Kikuchi et al. |
| 7,605,415 B2 | 10/2009 | Koizumi et al. |
| 7,629,568 B2 | 12/2009 | Koizumi et al. |
| 7,633,540 B2 | 12/2009 | Totsuka |
| 7,808,537 B2 | 10/2010 | Fujimura et al. |
| 7,872,286 B2 | 1/2011 | Okita et al. |
| 7,907,196 B2 | 3/2011 | Ogura et al. |
| 7,928,477 B2 | 4/2011 | Kobayashi et al. |
| 7,935,995 B2 | 5/2011 | Watanabe et al. |
| 7,948,540 B2 | 5/2011 | Ogura et al. |
| 7,948,541 B2 | 5/2011 | Koizumi et al. |
| 7,990,440 B2 | 8/2011 | Kobayashi et al. |
| 8,045,034 B2 | 10/2011 | Shibata et al. |
| 8,084,729 B2 | 12/2011 | Kato et al. |
| 8,085,319 B2 | 12/2011 | Ono et al. |
| 8,120,681 B2 | 2/2012 | Ryoki et al. |
| 8,154,639 B2 | 4/2012 | Kato et al. |
| 8,169,525 B2 | 5/2012 | Ryoki et al. |
| 8,174,600 B2 | 5/2012 | Ogura et al. |
| 8,189,081 B2 | 5/2012 | Totsuka |
| 8,289,432 B2 | 10/2012 | Shibata et al. |
| 8,345,133 B2 | 1/2013 | Matsuda et al. |
| 8,400,546 B2 | 3/2013 | Itano et al. |
| 8,411,178 B2 | 4/2013 | Ogura et al. |
| 8,411,185 B2 | 4/2013 | Totsuka |
| 8,456,559 B2 | 6/2013 | Yamashita et al. |
| 8,477,224 B2 | 7/2013 | Ogura et al. |
| 8,520,102 B2 | 8/2013 | Ogura et al. |
| 8,552,353 B2 | 10/2013 | Kobayashi et al. |
| 8,553,115 B2 | 10/2013 | Arishima et al. |
| 8,553,118 B2 | 10/2013 | Saito et al. |
| 8,605,182 B2 | 12/2013 | Totsuka et al. |
| 8,670,056 B2 | 3/2014 | Kono et al. |
| 8,698,062 B2 | 4/2014 | Yoshida |
| 8,872,092 B2 | 10/2014 | Ryoki et al. |
| 8,884,391 B2 | 11/2014 | Fudaba et al. |
| 8,937,672 B2 | 1/2015 | Totsuka et al. |
| 8,963,271 B2 | 2/2015 | Yamazaki et al. |
| 9,007,501 B2 | 4/2015 | Matsuda et al. |
| 9,013,765 B2 | 4/2015 | Totsuka |
| 9,019,141 B2 | 4/2015 | Hashimoto et al. |
| 9,049,389 B2 | 6/2015 | Hashimoto et al. |
| 9,147,708 B2 | 9/2015 | Okita et al. |
| 9,153,610 B2 | 10/2015 | Kobayashi et al. |
| 9,159,750 B2 | 10/2015 | Ikeda et al. |
| 9,282,263 B2 | 3/2016 | Totsuka |
| 9,332,202 B2 | 5/2016 | Totsuka |
| 9,344,653 B2 | 5/2016 | Shimotsusa et al. |
| 9,350,958 B2 | 5/2016 | Totsuka et al. |
| 9,407,839 B2 | 8/2016 | Yoshida |
| 9,538,112 B2 | 1/2017 | Wada et al. |
| 9,548,328 B2 | 1/2017 | Hasegawa et al. |
| 2001/0020909 A1 | 9/2001 | Sakuragi et al. |
| 2004/0017494 A1 | 1/2004 | Lu et al. |
| 2004/0099790 A1 | 5/2004 | Knee et al. |
| 2005/0072978 A1 | 4/2005 | Raynor |
| 2007/0177043 A1 | 8/2007 | Kok |
| 2011/0221931 A1* | 9/2011 | Wakabayashi ........... G01K 7/01 348/229.1 |
| 2013/0153749 A1 | 6/2013 | Sakurai |
| 2013/0175652 A1 | 7/2013 | Yamazaki et al. |
| 2014/0022354 A1 | 1/2014 | Okigawa et al. |
| 2014/0061436 A1 | 3/2014 | Kobayashi |
| 2014/0263950 A1* | 9/2014 | Fenigstein ............. H04N 5/355 250/208.1 |
| 2015/0201144 A1 | 7/2015 | Kobayashi et al. |
| 2015/0264283 A1 | 9/2015 | Kobayashi et al. |
| 2015/0281616 A1 | 10/2015 | Muto et al. |
| 2015/0319380 A1 | 11/2015 | Yoshida |
| 2015/0365616 A1 | 12/2015 | Yoshida |
| 2016/0247846 A1 | 8/2016 | Iida et al. |
| 2016/0301886 A1 | 10/2016 | Muto et al. |
| 2016/0360126 A1 | 12/2016 | Soda et al. |
| 2018/0054580 A1* | 2/2018 | Adachi ................. H04N 5/363 |

FOREIGN PATENT DOCUMENTS

| | | |
|---|---|---|
| DE | 10006525 A1 | 10/2001 |
| JP | 2001-223566 A | 8/2001 |
| JP | 2005-311487 A | 11/2005 |
| JP | 2012-079861 A | 4/2012 |
| WO | 2008/146236 A1 | 12/2008 |

OTHER PUBLICATIONS

U.S. Appl. No. 15/237,255, filed Aug. 15, 2016.
U.S. Appl. No. 15/257,549, filed Sep. 6, 2016.
U.S. Appl. No. 15/235,679, filed Aug. 12, 2016.
U.S. Appl. No. 15/227,576, filed Aug. 3, 2016.
U.S. Appl. No. 15/420,903, filed Jan. 31, 2017.
David X.D. Yang et al., "A Nyquist Rate Pixel Level ADC for CMOS Image Sensors", Custom Integrated Circuits Conference, IEEE May 1998, pp. 237-240.
Jul. 6, 2015 extended European Search Report concerning corresponding European Patent Application No. 15158989.2.
Office Action dated Mar. 27, 2017, in European Patent Application No. 15158989.2.
Office Action dated Sep. 5, 2017, in Chinese Patent Application No. 201510137664.7.
Office Action dated Jul. 26, 2018, in European Patent Application No. 15158989.2.

* cited by examiner

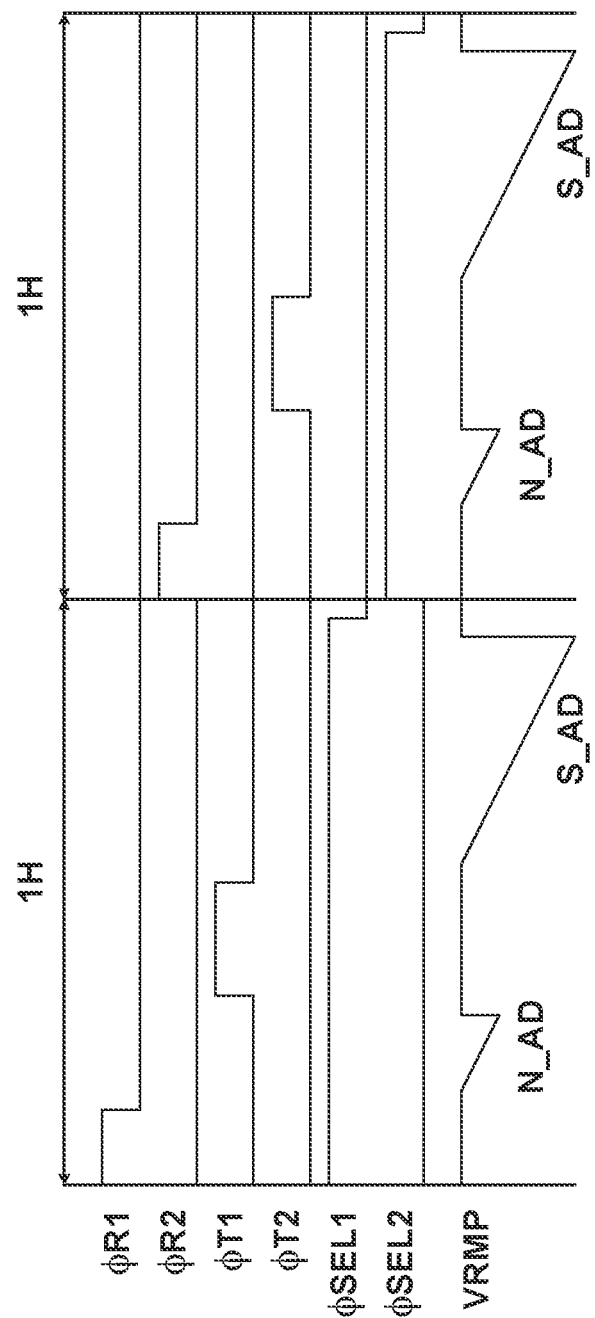

SOLID-STATE IMAGE SENSOR AND IMAGE SENSING SYSTEM

This is a continuation of U.S. patent application Ser. No. 14/662,604, filed Mar. 19, 2015.

BACKGROUND OF THE INVENTION

Field of the Invention

The present invention relates to a solid-state image sensor and image sensing system.

Description of the Related Art

FIG. 2 of Japanese Patent Laid-Open No. 2001-223566 shows a comparator including pixels 201, 202, and 203, a current path formation block 210, a current path 211, and a comparison unit 215. The current path formation block 210 includes MOS transistors 204, 205, and 206 having gates to which charge-voltage converters of the pixels 201, 202, and 203 are respectively connected. The current path 211 includes a MOS transistor having a gate to which a reference voltage 212 is supplied. The comparison unit 215 includes an arithmetic amplifier including the current path formation block 210 and current path 211 as a differential pair, and can obtain a digital signal corresponding to a pixel signal based on the output from the comparison unit 215.

In this arrangement shown in FIG. 2 of Japanese Patent Laid-Open No. 2001-223566, a transistor 213 which forms the differential pair together with the amplification transistors 204, 205, and 206 of the pixels 201, 202, and 203 is provided outside the pixels 201, 202, and 203. In an arrangement like this, it is difficult to improve the balance between one current path and the other current path forming the differential pair, and this sometimes makes it difficult to sufficiently increase the readout accuracy of a pixel signal.

SUMMARY OF THE INVENTION

The present invention provides a technique advantageous to increase the readout accuracy of a pixel signal.

One of aspects of the present invention provides a solid-state image sensor comprising an image sensing unit including a plurality of pixel blocks, and a readout unit configured to read out a signal from the image sensing unit, wherein the pixel block includes a photoelectric converter, a first transistor, a second transistor, and a current source, a first main electrode of the first transistor and a first main electrode of the second transistor are connected to a common node, and the current source is provided in a path between the common node and a predetermined voltage, a readout operation for reading out a signal from the image sensing unit includes an operation in which a voltage corresponding to charges generated in the photoelectric converter is supplied to a control electrode of the first transistor, and a temporally changing reference voltage is supplied to a control electrode of the second transistor, and the readout unit reads out a signal from the image sensing unit via a second main electrode of the first transistor.

Further features of the present invention will become apparent from the following description of exemplary embodiments with reference to the attached drawings.

BRIEF DESCRIPTION OF THE DRAWINGS

FIG. 7 is a view showing the operation of the solid-state image sensor according to the second embodiment of the present invention;

DESCRIPTION OF THE EMBODIMENTS

Exemplary embodiments of the present invention will be explained below with reference to the accompanying drawings.

Figure 1:
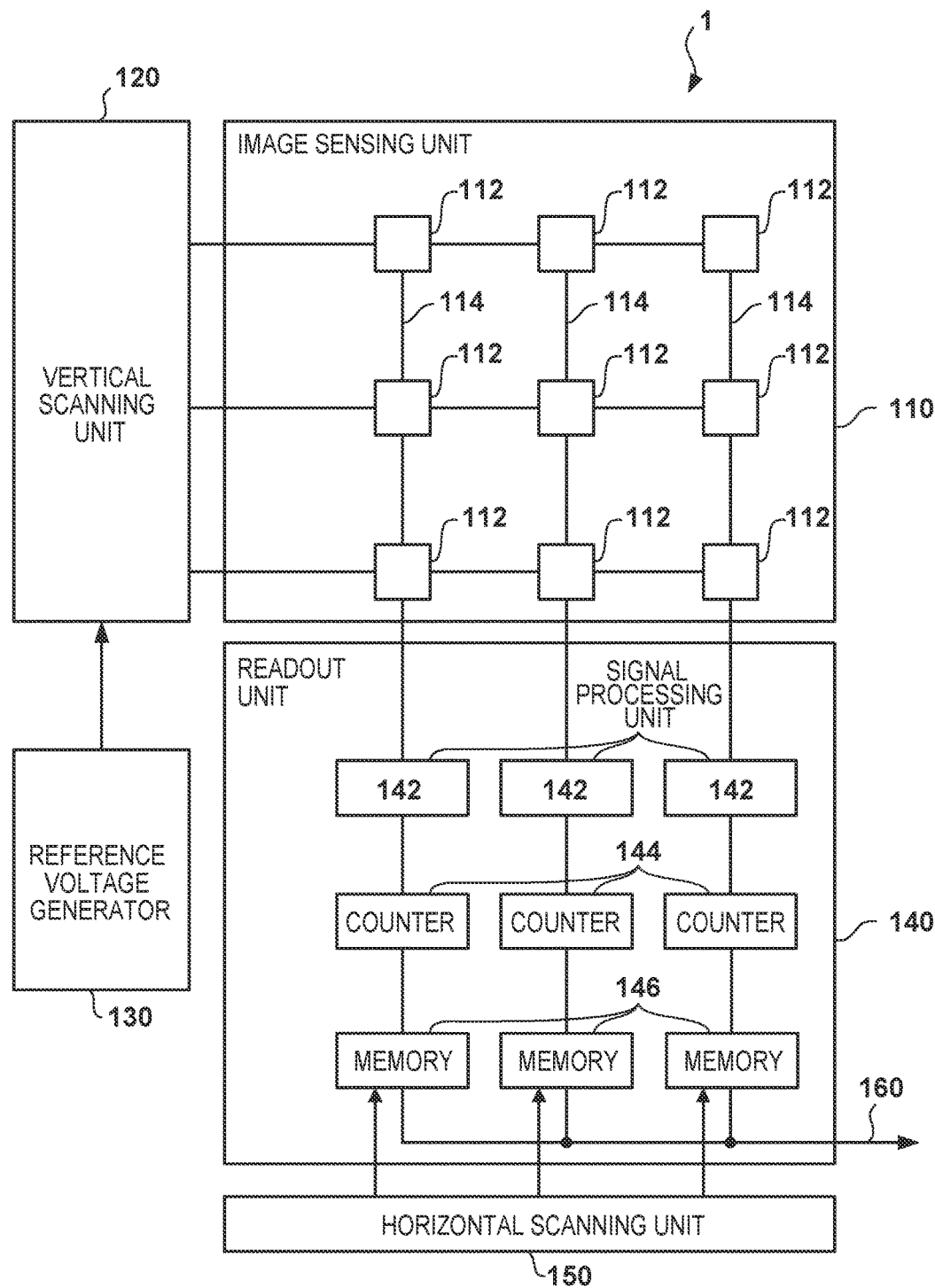
FIG. 1 is a view showing the arrangement of a solid-state image sensor according to one embodiment of the present invention.

FIG. 1 shows the arrangement of a solid-state image sensor 1 according to one embodiment of the present invention. The solid-state image sensor 1 includes an image sensing unit 110, and a readout unit 140 for reading out a signal from the image sensing unit 110. The image sensing unit 110 includes a plurality of pixels 112 as arranged as to form a plurality of rows and a plurality of columns, and each pixel 112 includes a photoelectric converter such as a photodiode. In other viewpoints, the image sensing unit 110 includes a plurality of pixel blocks, each pixel block includes at least one pixel 112, and each pixel includes a photoelectric converter.

The solid-state image sensor 1 includes a vertical scanning unit (vertical selecting unit) 120 and horizontal scanning unit (horizontal selecting unit) 150 for selecting a pixel 112 from which a signal is read out. The vertical scanning unit 120 selects a row to be read out from a plurality of rows in the image sensing unit 110, and the readout unit 140 reads out signals of the pixels 112 in the selected row through a vertical transmission path 114. The horizontal scanning unit 150 selects the pixels 112 in a column to be read out from the signals of the pixels 112 in the plurality of columns read out by the readout unit 140, and outputs signals of the selected pixels 112 to an output signal line 160. That is, the horizontal scanning unit 150 selects a column to be read out from the plurality of columns in the image sensing unit 110.

Figure 3:
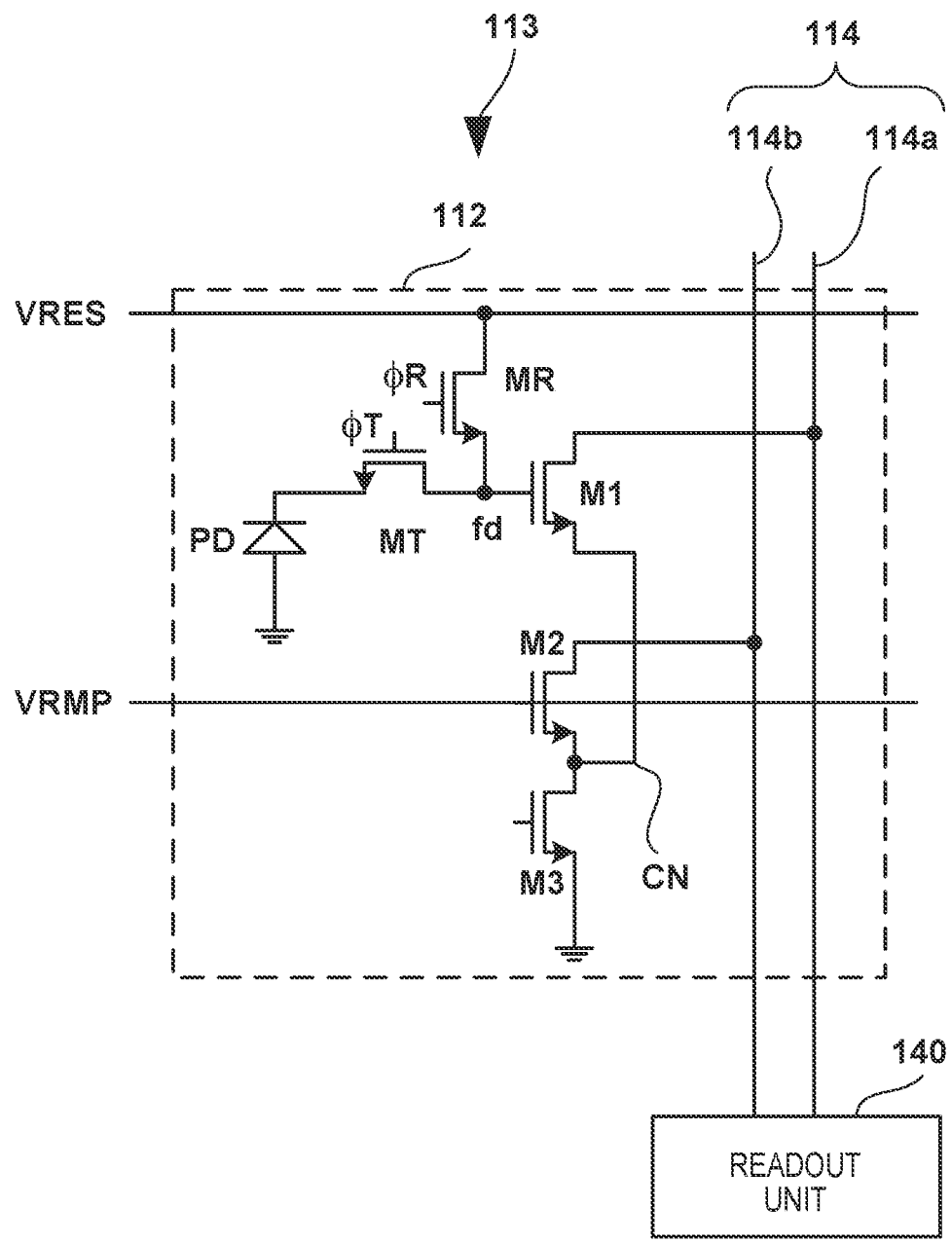
FIG. 3 is a view for exemplarily explaining the principle of the present invention.

The solid-state image sensor 1 further includes a reference voltage generator 130. The reference voltage generator 130 generates a temporally changing reference voltage. This temporally changing reference voltage is typically a ramp signal. The reference voltage generated by the reference voltage generator 130 can be supplied, via the vertical scanning unit 120, to a pixel block 113 including the pixels 112 in the row to be read out of the image sensing unit 110. The reference voltage may also be supplied to the pixel block 113 without using the vertical scanning unit 120. As exemplarily shown in FIG. 3, each pixel block 113 includes at least one photoelectric converter (for example, a photodiode) PD, a first transistor M1, a second transistor M2, and a current source M3. The first main electrode (in this example, the source electrode) of the first transistor M1 and the first main electrode (in this example, the source electrode) of the second transistor M2 are connected to a common node CN, and the third transistor M3 is provided in a path between the common node CN and a predetermined potential (in this example, a ground potential). The third transistor M3 functions as a current source when a predetermined bias voltage is applied to the control electrode (gate). The first transistor M1, second transistor M3, and current source M3 form a differential amplifier circuit. An output from this differential amplifier circuit is transmitted to the readout unit 140 through the vertical transmission path 114. In the example shown in FIG. 3, one vertical transmission path 114 includes first and second vertical signal lines 114a and 114b which form a differential signal line pair. In another example, one vertical transmission path 114 includes one vertical signal line 114a.

A readout operation for reading out a signal from the image sensing unit 110 includes an operation in which a voltage corresponding to charges generated in the photoelectric converter PD of the pixel 112 to be read out is supplied to the control electrode of the first transistor M1, and a temporally changing reference voltage VRMP is supplied to the control electrode of the second transistor M2. Note that the control electrode is the gate electrode. The readout unit 140 reads out a signal from the image sensing unit 110 through the second main electrode (in this example, the drain electrode) of the first transistor M1 and the vertical transmission path 114. In the example shown in FIG. 3, the readout unit 140 reads out a signal from the image sensing unit 110 based on a signal transmitted to the first vertical signal line 114a connected to the second main electrode of the first transistor M1, and a signal transmitted to the second vertical signal line 114b connected to the main electrode of the second transistor M2. The charges generated in the photoelectric converter PD are transferred, through a transfer transistor MT, to a charge-voltage converter (floating diffusion) fd connected to the control electrode (gate) of the first transistor M1, and converted into a voltage by the charge-voltage converter fd. The voltage of the charge-voltage converter fd is reset by a voltage control transistor MR.

A transfer signal φT driven by the vertical scanning unit 120 is applied to the gate of the transfer transistor MT. A voltage control signal φR driven by the vertical scanning unit 120 is applied to the gate of the voltage control transistor MR. In the following description, when distinguishing between one transfer signal and another transfer signal, numbers are added after φT like φT1 and φT2. Similarly, when distinguishing between one voltage control signal and another voltage control signal, numbers are added after φR like φR1 and φR2. This applies to other signals.

The readout unit 140 converts a signal transmitted from the pixel 112 of the image sensing unit 110 through the vertical transmission path 114 into a digital signal, and outputs the signal to the output signal line 160. In a general solid-state image sensor which outputs a pixel signal as a digital signal, a column amplifier formed for each column of an image sensing unit reads out a signal from a pixel in the form of an analog voltage signal, and an AD converter converts this analog voltage signal into a digital signal. To the contrary, in the solid-state image sensor 1 of this embodiment, a signal transmitted from a pixel to the vertical transmission path 114 has a form in current signal, and this current signal is converted into a digital signal.

The readout unit 140 can include a signal processing unit 142, counter 144, and memory 146. A set of the signal processing unit 142, counter 144, and memory 146 can be formed for each column of the image sensing unit 110. The signal processing unit 142 receives an electric current supplied from the second main electrode of the first transistor M1 through the vertical transmission path 114. Based on the value of this electric current, the signal processing unit 142 detects a timing at which the magnitude relation between the voltage of the control electrode of the first transistor M1 (this voltage is also the voltage of the charge-voltage converter fd) and the voltage (reference voltage VRMP) of the control electrode of the second transistor M2 inverts. For example, the signal processing unit 142 compares the value of a first electric current supplied from the second main electrode of the first transistor M1 through the first vertical signal line 114a with the value of a second electric current supplied from the second main electrode of the second transistor M2 through the second vertical signal line 114b. Then, the signal processing unit 142 outputs a comparison result signal indicating the magnitude relation between the values of the first and second electric currents. The inversion of this comparison result signal means that the magnitude relation between the values of the first and second electric currents has inverted. Also, the inversion of the magnitude relation between the values of the first and second electric currents is equivalent to the inversion of the magnitude relation between the voltages of the control electrodes of the first and second transistors M1 and M2.

The counter 144 starts a count operation at a predetermined timing, and stops the count operation in accordance with the inversion of the comparison result signal. The memory 146 holds a count value (that is, a pixel value) obtained by the counter 144, and outputs the count value to the output signal line 160 when selected by the horizontal scanning unit 150. That is, the readout unit 140 decides that the count value of the counter 144 is the value of a signal read out from the image sensing unit 110, in accordance with the inversion of the output from the signal processing unit 142.

Figure 2:
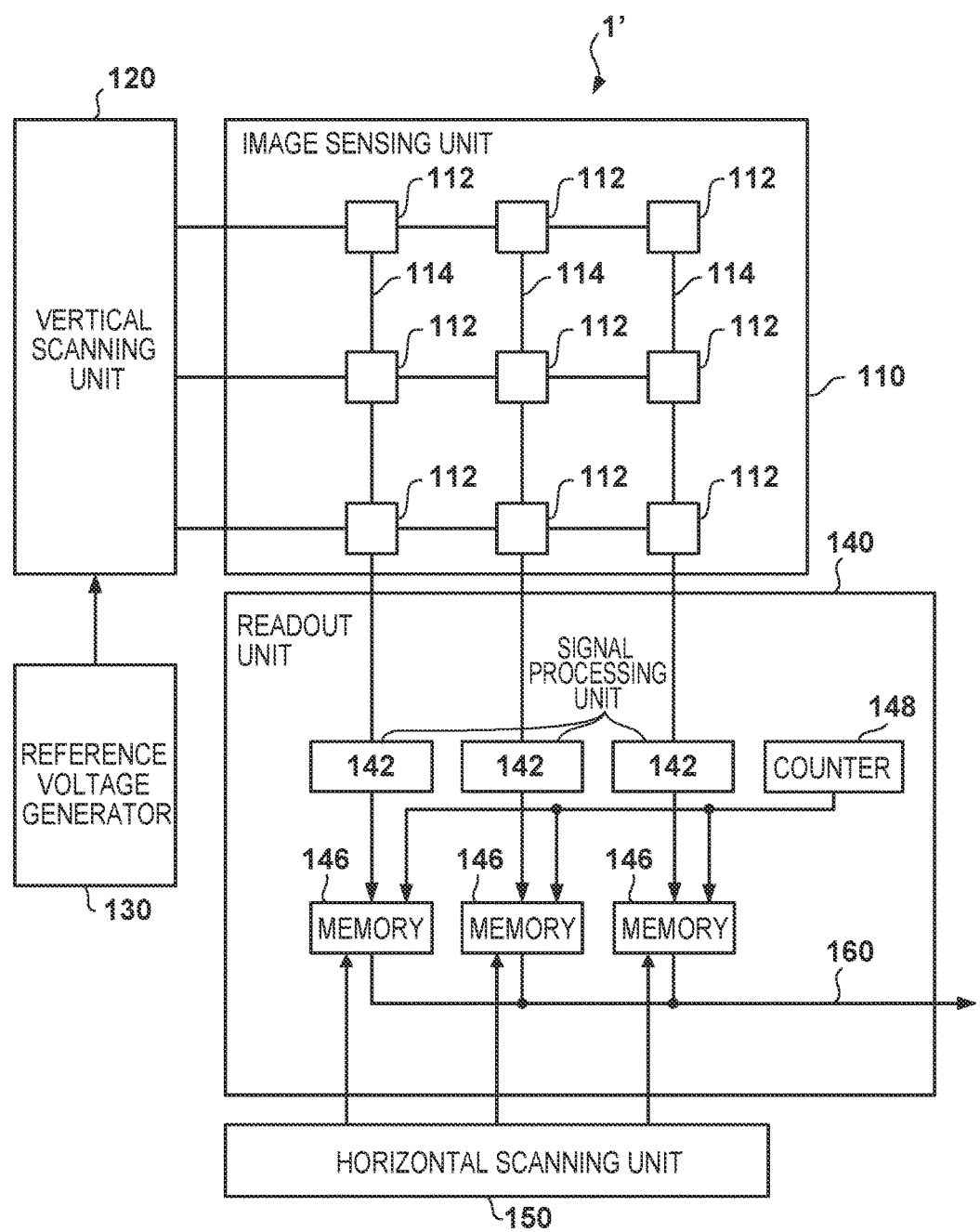
FIG. 2 is a view showing the arrangement of a solid-state image sensor according to another embodiment of the present invention.

FIG. 2 shows the arrangement of a solid-state image sensor 1' of another embodiment of the present invention. The solid-state image sensor 1' differs from the solid-state image sensor 1 in that the plurality of counters 144 (that is, the counter 144 formed for each column) of the solid-state image sensor 1 are replaced with one common counter 148. In the solid-state image sensor 1', the memory 146 holds the count value of the counter 148 in response to the inversion of the comparison result signal from the signal processing unit 142. In the example shown in FIG. 2, the readout unit 140 decides, for each column, that the count value of the common counter 148 is the value of a signal read out from the image sensing unit 110, in accordance with the inversion of the output from the signal processing unit 142.

In the architecture as described above, the first transistor M1, second transistor M2, and current source M3 are provided close to each other. This makes it possible to decrease both the parasitic resistances on the source sides of the first and second transistors M1 and M2. Accordingly, it is possible to improve the balance between the current path including the first transistor M1 and the current path including the second transistor M2, thereby improving the differential input characteristic balance. As a consequence, the pixel signal readout accuracy increases.

Figure 4:
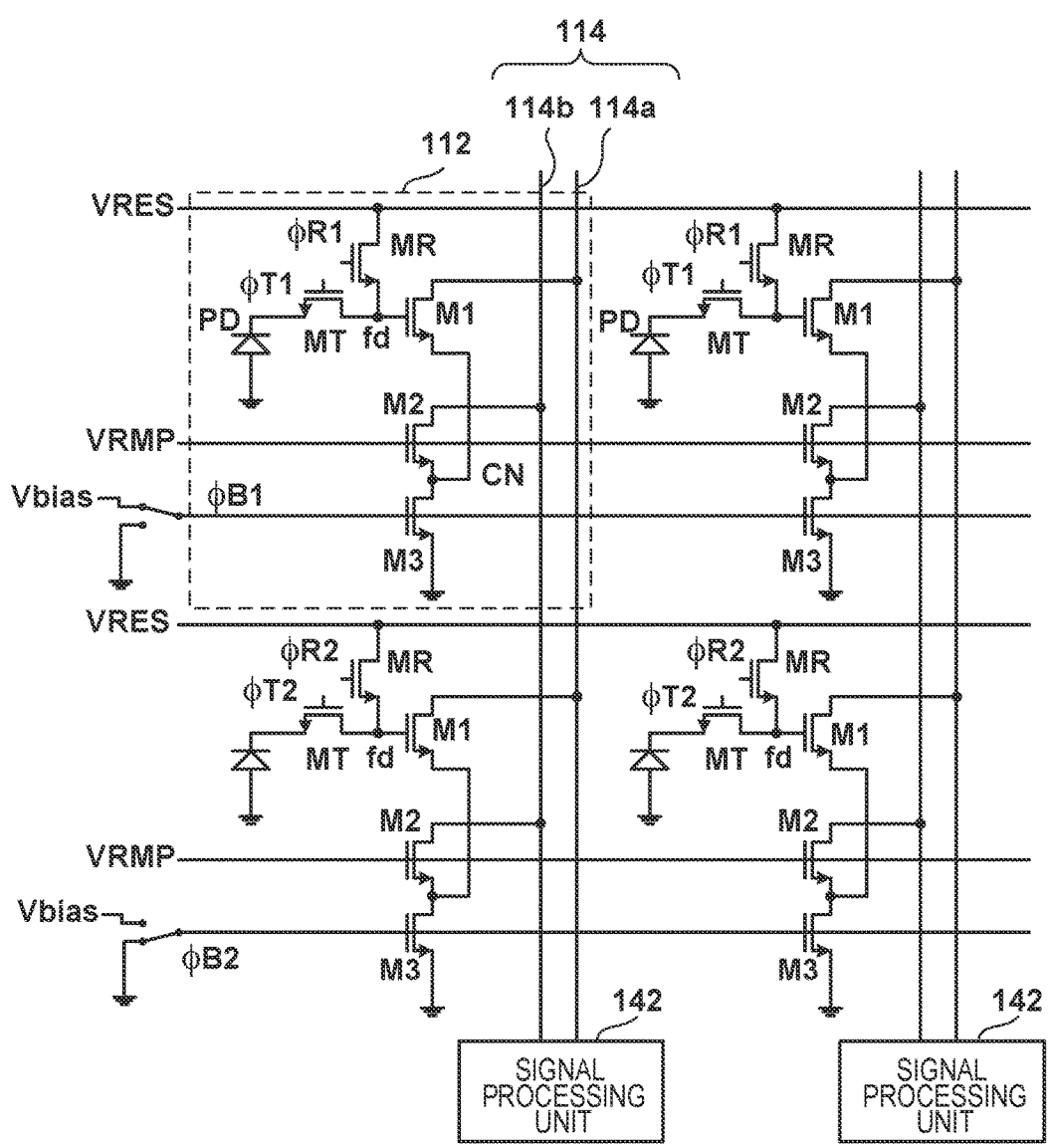
FIG. 4 is a view showing the arrangement of an image sensing unit of the solid-state image sensor according to the first embodiment of the present invention.

More practical embodiments will be explained below. FIG. 4 shows the arrangement of an image sensing unit 110 of a solid-state image sensor of the first embodiment. For the sake of simplicity, a plurality of pixels 112 forming the image sensing unit 110 are represented by two rows×two columns of pixels 112. In this solid-state image sensor of the first embodiment, one pixel 112 forms one pixel block. Each pixel 112 (a pixel block) includes a photoelectric converter PD such as a photodiode, a first transistor M1, a second transistor M2, and a current source M3 formed by a transistor or the like. Each pixel 112 can also include a transfer transistor MT and voltage control transistor MR.

The first main electrode (source electrode) of the first transistor M1 and the first main electrode (source electrode) of the second transistor M2 are connected to a common node CN, and the third transistor M# is provided in a path between the common node CN and a predetermined potential (in this example, a ground potential). The third transistor M3 functions as a tail current source when a predetermined bias voltage Vbias is applied to the control electrode (gate). The first transistor M1, second transistor M2, and current source M3 form a differential amplifier circuit. This circuit formed by the first transistor M1, second transistor M2, and current source M3 can also be regarded as a voltage comparator for comparing the voltage of the control electrode of the first transistor M1 (this voltage is also the voltage of a charge-voltage converter fd) with the voltage (a reference voltage VRMP) of the control electrode of the second transistor M2.

A readout operation for reading out a signal from the image sensing unit 110 includes an operation in which a voltage corresponding to charges generated in the photoelectric converter PD of the pixel 112 to be read out is supplied to the control electrode of the first transistor M1, and the temporally changing reference voltage VRMP is supplied to the control electrode of the second transistor M2. A readout unit 140 reads out a signal from the image sensing unit 110 through the second main electrode of the first transistor M1 and a vertical transmission path 114.

Figure 5:
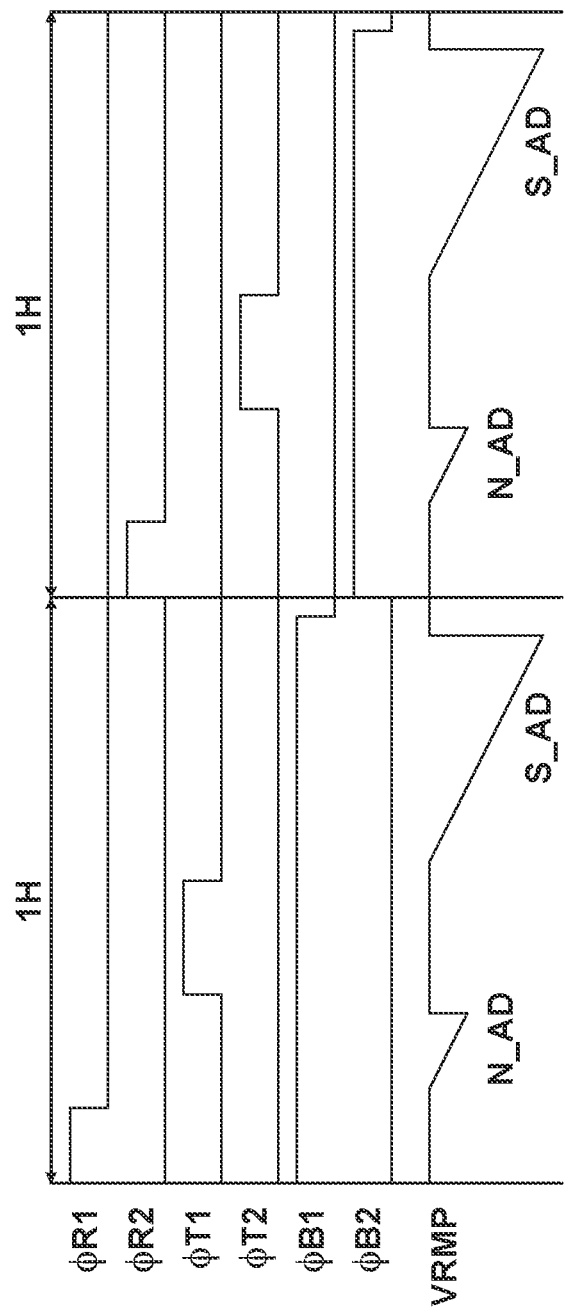
FIG. 5 is a view showing the operation of the solid-state image sensor according to the first embodiment of the present invention.

FIG. 5 shows the operation of the solid-state image sensor of the first embodiment, more specifically, a two-row signal readout operation. FIG. 5 shows a one-row readout period as "1H" (one horizontal scanning period). A first-row readout period is a period in which a first-row bias signal φB1 is High (a bias voltage), and a second-row bias signal φB2 is Low. When the bias signal φB1 activates the current source M3 of the pixels 112 in the first row, the pixels 112 in the first row are set in a selected state. When the bias signal φB1 deactivates the current source M3 of the pixels 112 in the first row, the pixels 112 in the first row are set in an unselected state. When the bias signal φB2 activates the current source M3 of the pixels 112 in the second row, the pixels 112 in the second row are set in the selected state. When the bias signal φB2 deactivates the current source M3 of the pixels 112 in the second row, the pixels 112 in the second row are set in the unselected state.

In the first-row readout period, a predetermined bias voltage Vbias is applied to the gate of the transistor forming each current source M3 in the first row, and the current source M3 functions as a tail constant current source. First, a voltage control signal φR1 is activated to High level. Consequently, the voltage control transistor MR is turned on, and the charge-voltage converter fd is reset to a voltage (reset voltage) corresponding to a reset voltage VRES.

Then, the voltage control signal φR1 is deactivated to Low level, and the charge-voltage converter fd floats. The initial voltage of the reference voltage VRMP is set to be much higher than the reset voltage of the charge-voltage converter fd such that almost the while electric current supplied by the current source M3 (the electric current defined by the current source M3) flows through the second transistor M2, and an electric current flowing through the first transistor M1 is almost zero. The reference voltage VRMP is linearly dropped, and a counter 144 (148) measures a time before the comparison result signal output from the signal processing unit 142 inverts due to the inversion of the magnitude relation between the reset voltage and reference voltage VRMP. The count value obtained by the counter 144 (148) and held in a memory 146 is a digital value (to be referred to as a noise value hereinafter) corresponding to the reset voltage (noise level) of the pixel 112. Reference symbol N_AD denotes the operation of holding the digital value corresponding to the reset voltage in the memory 146 as described above.

Subsequently, the reference voltage VRMP is returned to the initial voltage, and the transfer signal φT1 is activated to High level. As a consequence, charges photoelectrically converted and accumulated by the photoelectric converter PD are transferred to the charge-voltage converter fd. After the transfer signal φT1 is deactivated to Low level, the reference voltage VRMP is linearly dropped. The counter 144 (148) measures a time before the comparison result signal output from the signal processing unit 142 inverts due to the inversion of the magnitude relation between the voltage of the charge-voltage converter fd and the reference voltage VRMP. The count value obtained by the counter 144 (148) and held in the memory 146 is a digital value (to be referred to as an optical signal value hereinafter) corresponding to the amount of charges generated by photoelectric conversion in the photoelectric converter PD of the pixel 112. Reference symbol S_AD denotes the operation of holding the digital value corresponding to the amount of charges generated by photoelectric conversion in the memory 146 as described above. The noise value and optical signal value held in the memory 146 can separately be output. It is also possible to output a value obtained by subtracting the noise value from the optical signal value (that is, a value subjected to CDS (Correlated Double Sampling)).

A second readout period is a period in which the second-row bias signal φB2 is High (a bias voltage), and the first-row bias signal φB1 is Low. A second-row read operation is executed by the same method as that for the first row.

Figure 6:
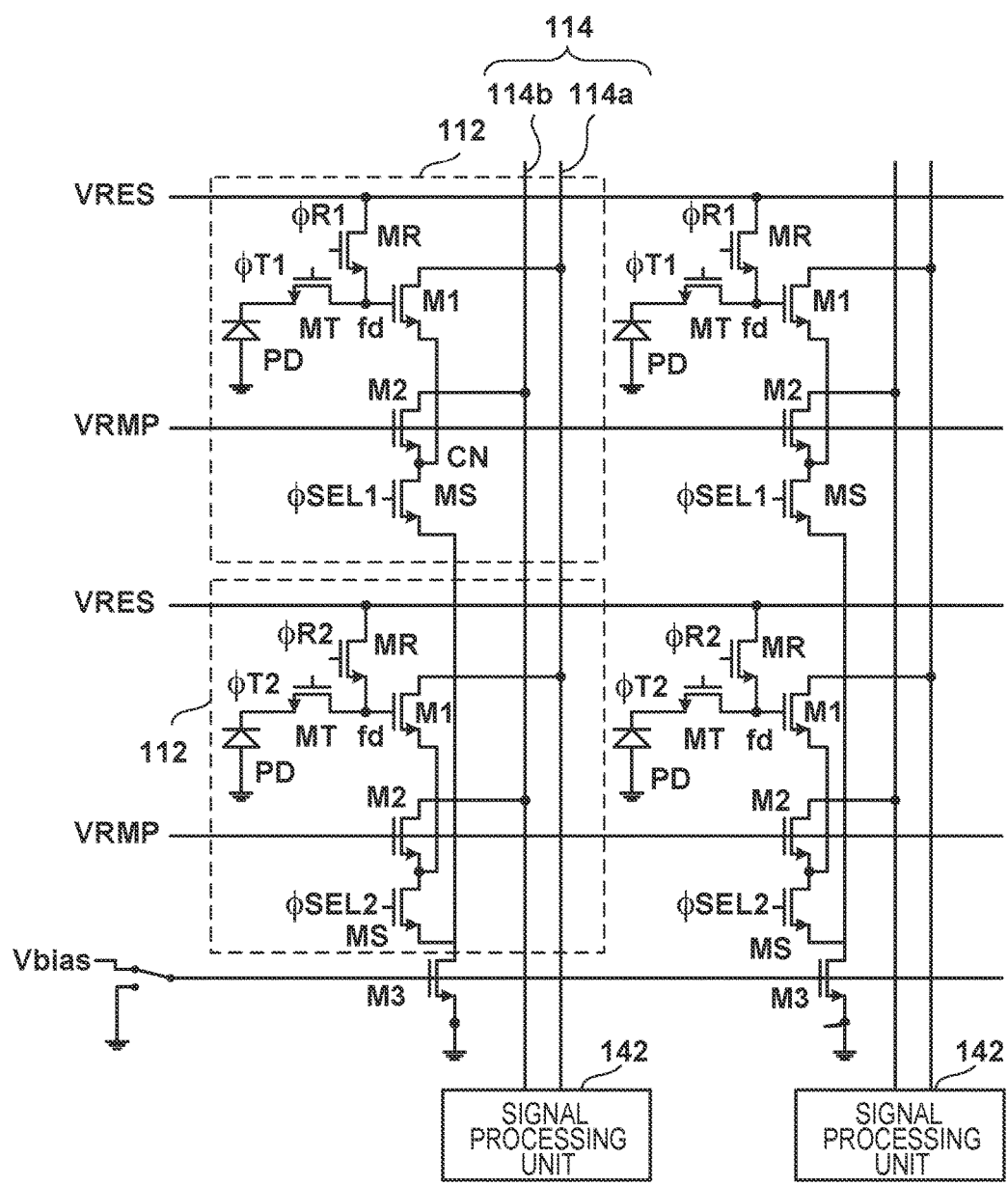
FIG. 6 is a view showing the arrangement of an image sensing unit of a solid-state image sensor according to the second embodiment of the present invention.

FIG. 6 shows the arrangement of an image sensing unit 110 of a solid-state image sensor of the second embodiment. FIG. 7 shows the operation of the solid-state image sensor of the second embodiment, more specifically, a two-row signal readout operation. FIG. 7 shows a one-row readout period as "1H" (one horizontal scanning period). For the sake of simplicity, a plurality of pixels 112 forming the image sensing unit 110 are represented by two rows×two columns of pixels 112. In the second embodiment, two pixels 112 share a third transistor M3 functioning as a tail current source. In the first embodiment, the bias signals φB1 and φB2 control row selection and non-selection. In the second embodiment, selection signals φSEL1 and φSEL2 control row selection and non-selection. In addition, in the second embodiment, a selection transistor MS is provided between a second transistor M2 and the current source M3 by the selection signals φSEL (φSEL1 and φSEL2). The second embodiment is the same as the first embodiment except the above differences.

In the second embodiment, two pixels 112 share the third transistor M3. However, more pixels 112 may share the third transistor M3. For example, the pixels 112 in one column may share the third transistor M3.

Figure 8A:
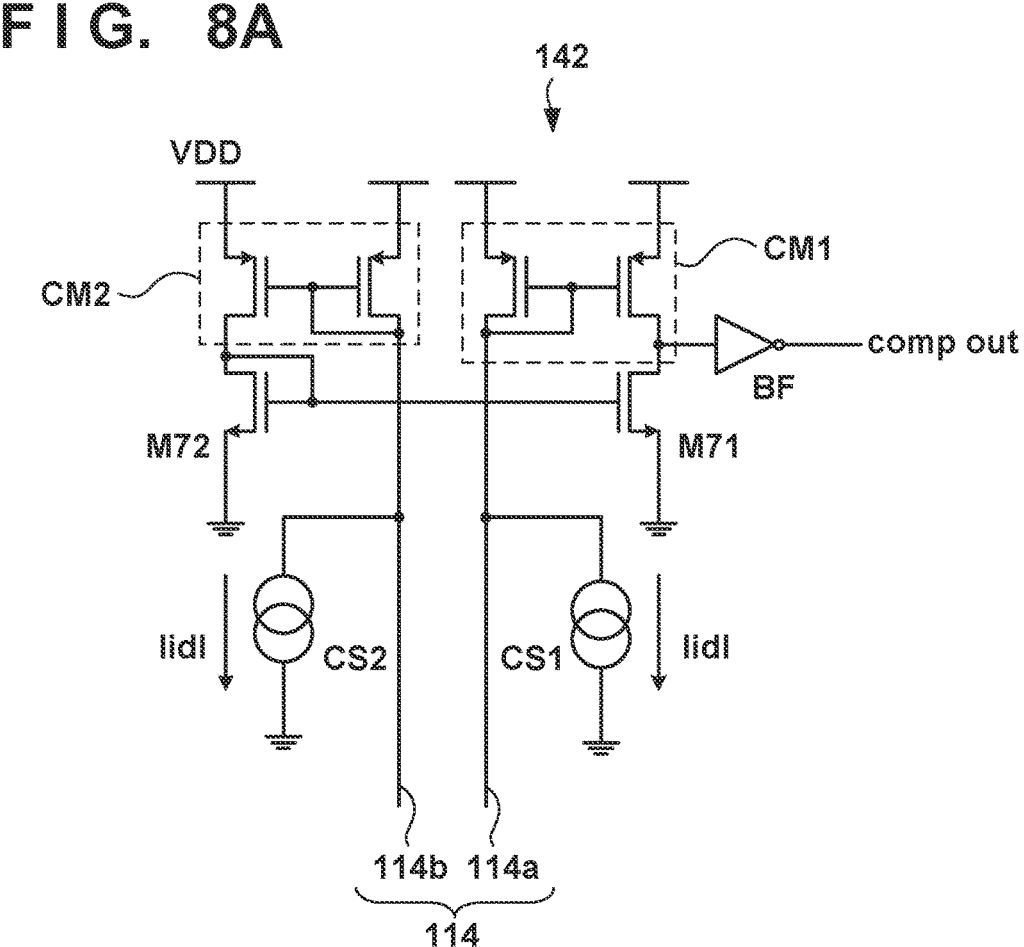
FIGS. 8A and 8B are views showing arrangement examples of a signal processing unit applicable to the first and second embodiments.

FIG. 8A shows the first example of the signal processing unit 142 applicable to the first and second embodiments. A first vertical signal line 114a is connected to a current mirror CM1 formed by a transistor such as a PMOS transistor. A second vertical signal line 114b is connected to a current mirror CM2 formed by a transistor such as a PMOS transistor. A transistor M71 is provided between the current mirror CM1 and a reference potential, a transistor M72 is provided between the current mirror CM2 and reference potential, and the transistors M71 and M72 form a current mirror. Consequently, the voltage of an output node between the current mirror CM1 and transistor M71 is determined by the magnitude relation between the electric currents of the first and second vertical signal lines 114a and 114b. A signal appearing at this output node is output as a comparison result signal comp out via a buffer circuit BF such as an inverter. Current sources CS1 and CS2 may also be connected to the first and second vertical signal lines 114a and 114b, respectively. The current sources CS1 and CS2 prevent the electric current flowing through the current mirrors CM1 and CM2 from becoming zero, thereby improving the response characteristic of the signal processing unit 142. The electric currents supplied by the current sources CS1 and CS2 are preferably smaller than the electric current supplied by the current source M3.

Figure 8B:
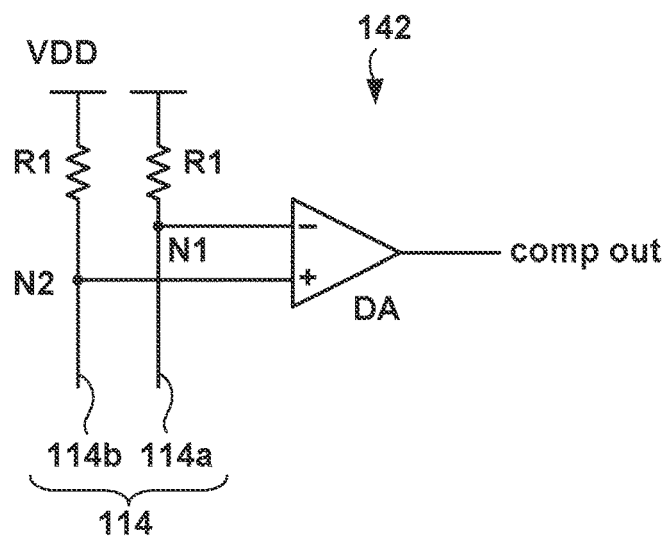

FIG. 8B shows the second example of the signal processing unit 142 applicable to the first and second embodiments. A first vertical signal line 114a is pulled up to a predetermined power supply VDD by a pull-up resistor R1. Likewise, a second vertical signal line 114b is pulled up to the power supply voltage VDD by the pull-up resistor R1. Consequently, electric currents flowing through the first and second vertical signal lines 114a and 114b are converted into voltages by nodes N1 and N2, respectively. The nodes N1 and N2 are connected to the input nodes of a differential amplifier DA in an open-loop state. The differential amplifier DA outputs a comparison result signal comp out.

Figure 9:
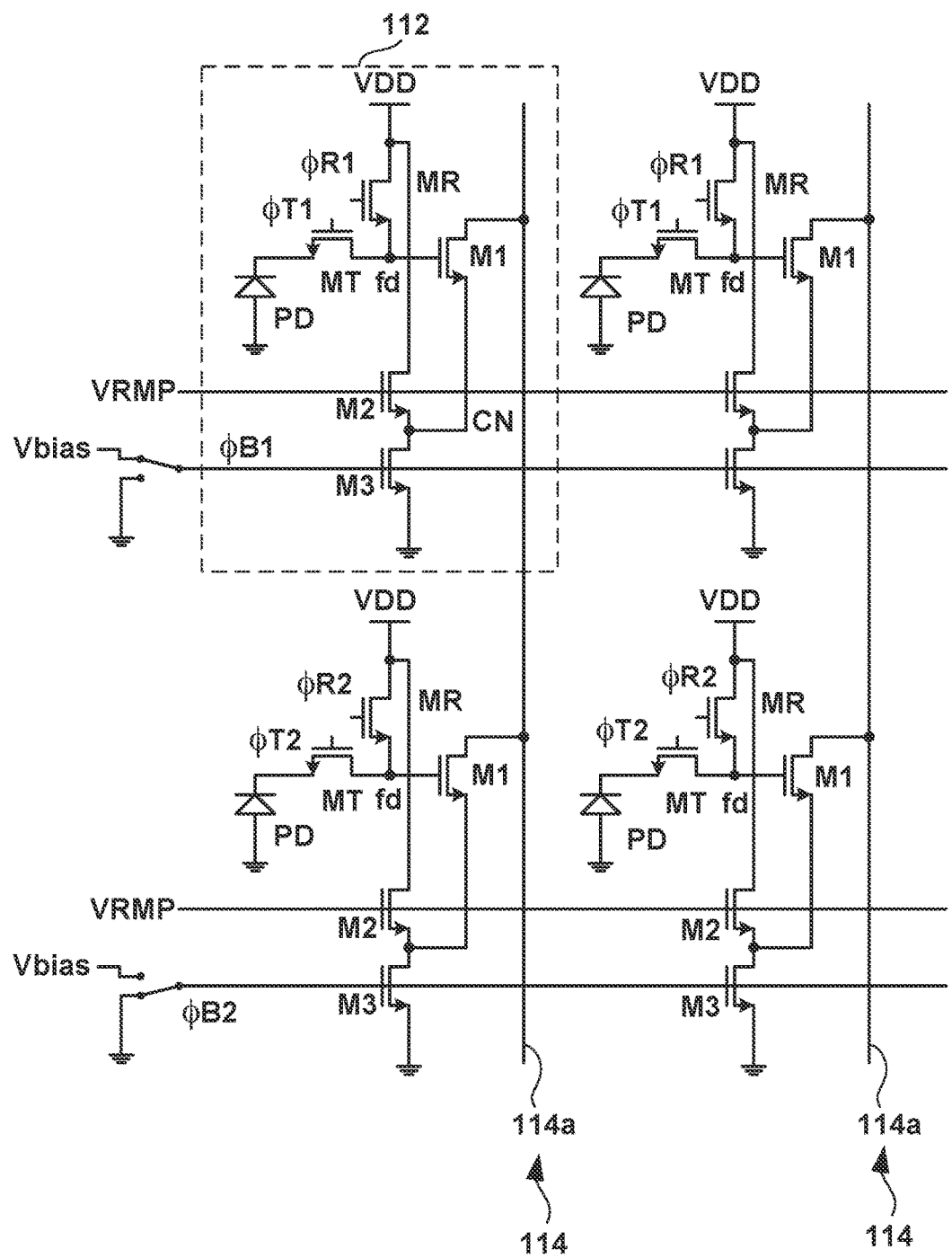
FIG. 9 is a view showing the arrangement of an image sensing unit of a solid-state image sensor according to the third embodiment of the present invention.
Figure 10:
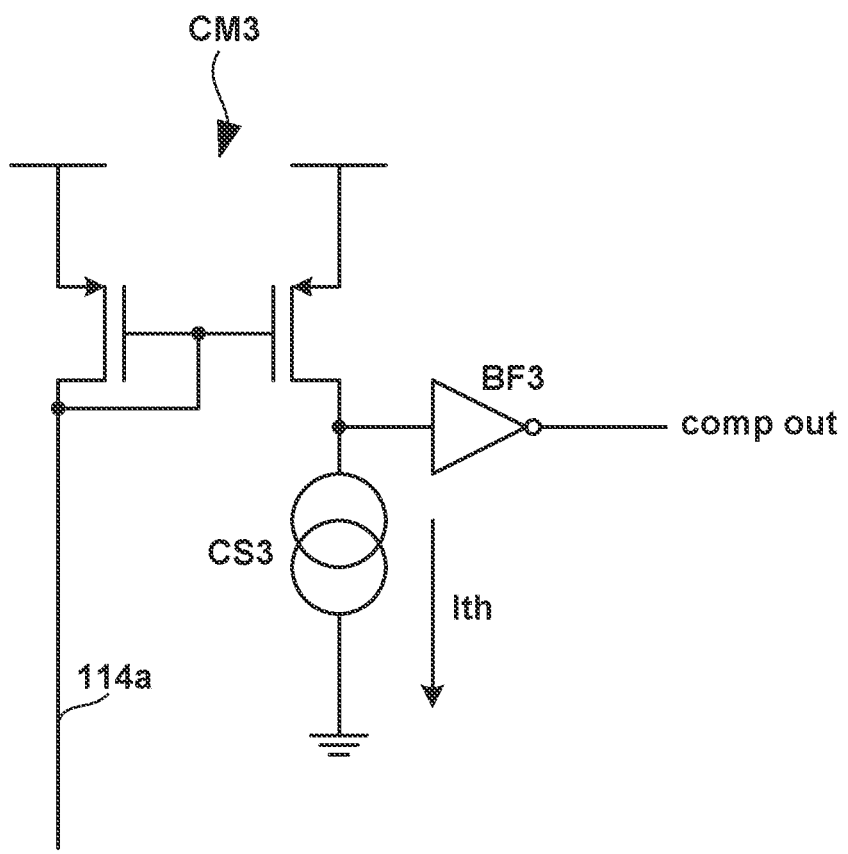
FIG. 10 is a view showing an arrangement example of a signal processing unit applicable to the third embodiment.

FIG. 9 shows the arrangement of an image sensing unit 110 of a solid-state image sensor of the third embodiment. For the sake of simplicity, a plurality of pixels 112 forming the image sensing unit 110 are represented by two rows×two columns of pixels 112. The third embodiment differs from the first and second embodiments in that each vertical transmission path 114 is formed by one vertical signal line 114a. In the third embodiment, a predetermined potential (for example, a power supply voltage VDD) is supplied to the second main electrode of a second transistor M2. FIG. 10 shows the first example of a signal processing unit 142 applicable to the third embodiment. A vertical signal line 114a and current source CS3 are connected to a current mirror CM3, the value of an electric current flowing through the vertical signal line 114a is compared with the value of an electric current flowing through the current source CS3, and a comparison result signal comp out is output. The signal processing unit 142 generates the comparison result signal comp out indicating the magnitude relation between the voltage of a charge-voltage converter fd and a reference voltage VRMP in the third embodiment as well.

Figure 11:
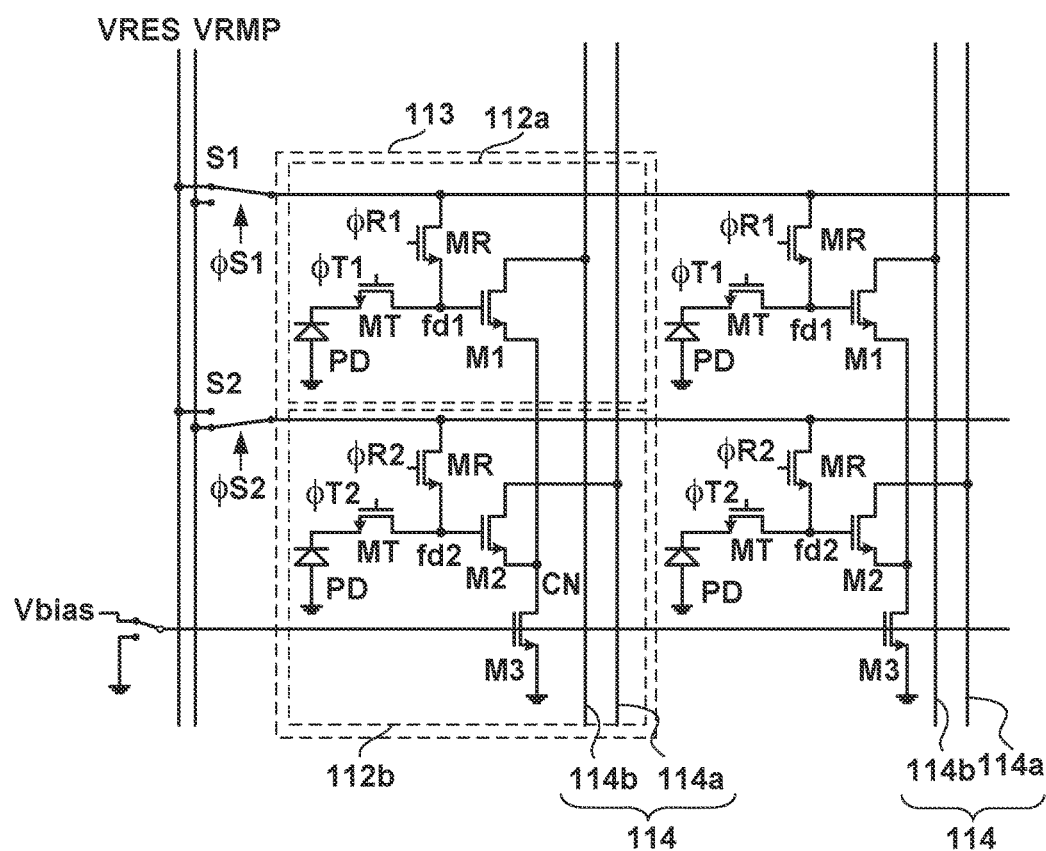
FIG. 11 is a view showing the arrangement of an image sensing unit of a solid-state image sensor according to the fourth embodiment of the present invention.
Figure 12:
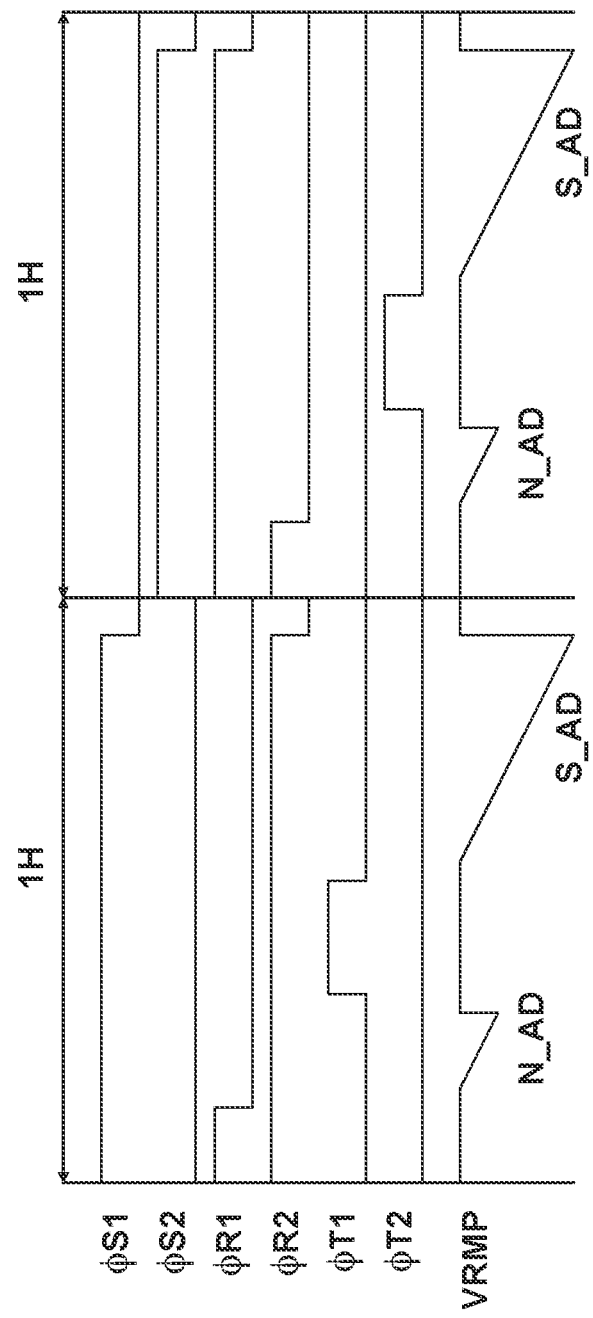
FIG. 12 is a view showing the operation of the solid-state image sensor according to the fourth embodiment of the present invention.

FIG. 11 shows the arrangement of an image sensing unit 110 of a solid-state image sensor of the fourth embodiment. FIG. 12 shows the operation of the solid-state image sensor of the fourth embodiment, more specifically, a two-row signal readout operation. FIG. 12 shows a one-row readout period as "1H" (one horizontal scanning period). For the sake of simplicity, a plurality of pixels 112 forming the image sensing unit 110 are represented by two rows×two columns of pixels 112.

In the fourth embodiment, when a pixel 112a is a pixel to be read out, a signal of the pixel 112a is read out by using a transistor M2 of a pixel 112b different from the pixel 112a as a second transistor. Also, when the pixel 112b is a pixel to be read out, a signal of the pixel 112b is read out by using a transistor M1 of the pixel 112a different from the pixel 112b as a second transistor. In another viewpoint, it is possible to regard that the pixels 112a and 112b form one pixel block 113, and the pixel block 113 includes the first transistor M1, the second transistor M2, and a current source M3. A readout operation for reading out a signal from the image sensing unit 110 includes an operation in which a voltage corresponding to charges generated in a photoelectric converter PD of the pixel block 113 is supplied to the control electrode of the first transistor M1, and a temporally changing reference voltage VRMP is supplied to the control electrode of the second transistor M2.

A reset voltage VRES or the reference voltage VRMP is supplied to the drain of a voltage control transistor TR via switches S (S1 and S2). More specifically, the reset voltage VRES is supplied to a charge-voltage converter fd (fd1 or fd2) of the pixel 112 (112a or 112b) to be read out in the pixel block 113. On the other hand, the reference voltage VRMP is supplied to the charge-voltage converter fd of the pixel 112 (112a or 112b) not to be read out.

In a first-row readout period, φS1 and φR2 are changed to High level, and φS2 is changed to Low level. First, a first-row voltage control signal φR1 is activated to High level. Consequently, the voltage control transistor MR of the pixel 112a in the first row is turned on, and the charge-voltage converter fd1 of the pixel 112a in the first row is reset to a voltage (reset voltage) corresponding to the reset voltage VRES. The reference voltage VRMP is supplied to the charge-voltage converter fd2 of the pixel 112*b* in the second row. Accordingly, as in the first embodiment, an operation (N_AD) of holding a digital value corresponding to the reset voltage in a memory 146 and an operation (S_AD) of holding a digital value corresponding to the amount of charges generated by photoelectric conversion in the memory 146 are performed.

In a second-row readout period, φS2 and φR1 are changed to High level, and φS1 is changed to Low level. First, a second-row voltage control signal φR2 is activated to High level. Consequently, the voltage control transistor MR of the pixel 112*b* in the second row is turned on, and the charge-voltage converter fd2 of the pixel 112*b* in the second row is reset to the voltage (reset voltage) corresponding to the reset voltage VRES. The reference voltage VRMP is supplied to the charge-voltage converter fd1 of the pixel 112*a* in the first row. Accordingly, the operation (N_AD) of holding the digital value corresponding to the reset voltage in the memory 146 and the operation (S_AD) of holding the digital value corresponding to the amount of charges generated by photoelectric conversion in the memory 146 are performed for the pixel in the second row.

Figure 13:
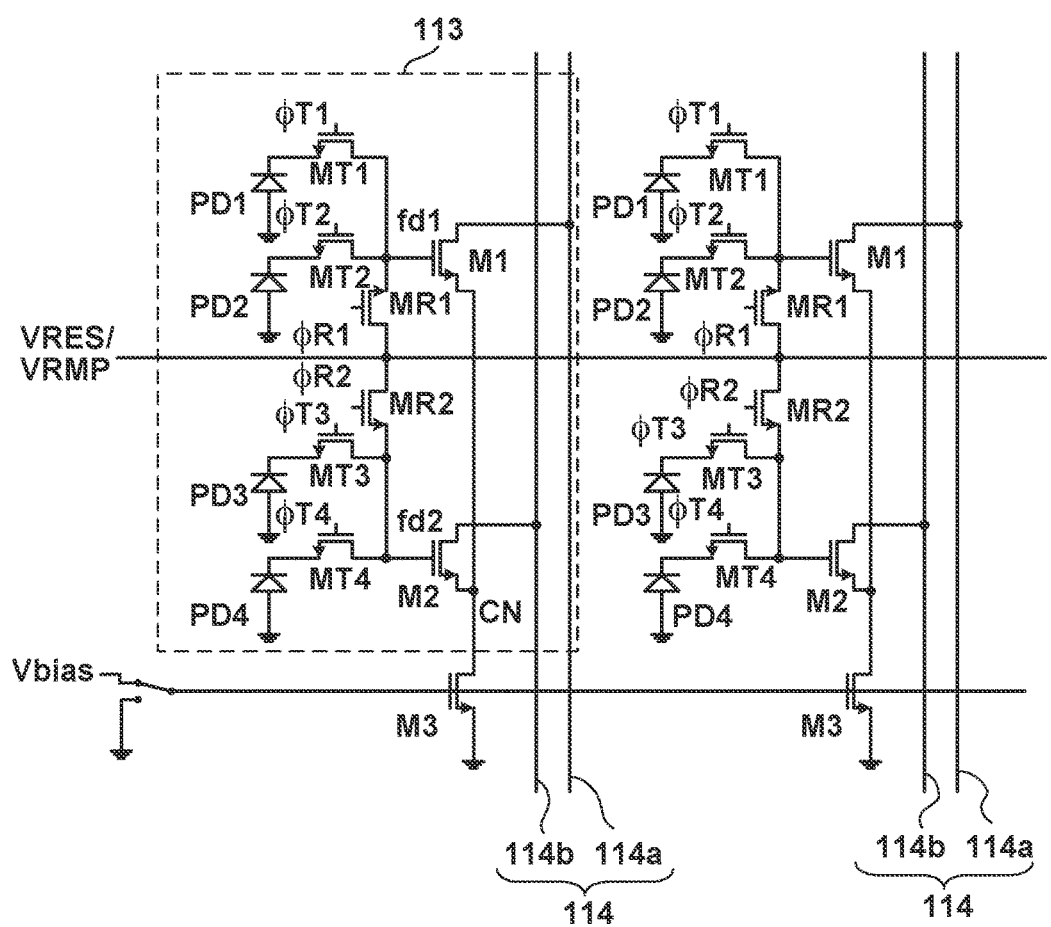
FIG. 13 is a view showing the arrangement of an image sensing unit of a solid-state image sensor according to the fifth embodiment of the present invention.
Figure 14:
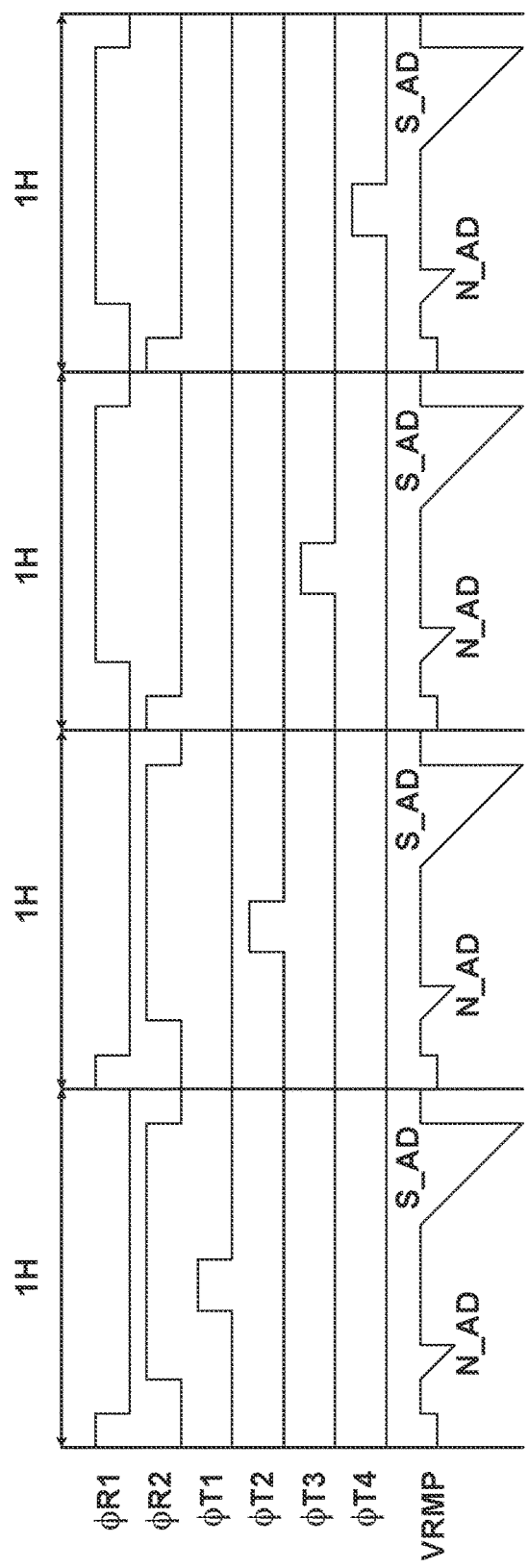
FIG. 14 is a view showing the operation of the solid-state image sensor according to the fifth embodiment of the present invention.

FIG. 13 shows the arrangement of an image sensing unit 110 of a solid-state image sensor of the fifth embodiment. FIG. 14 shows the operation of the solid-state image sensor of the fifth embodiment, more specifically, a four-row signal readout operation. For the sake of simplicity, a plurality of pixels 112 forming the image sensing unit 110 are represented by four rows×two columns of pixels 112. In the fifth embodiment, a signal line for supplying a reference voltage VRMP and a signal line for supplying a reset voltage VRES are integrated as a common signal line VRES/VRMP. A first switch MR1 controlled by a first voltage control signal φR1 is provided in a path between a first charge-voltage converter fd1 and the signal line VRES/VRMP. Also, a second switch MR2 controlled by a second voltage control signal φR2 is provided in a path between a second charge-voltage converter fd2 and the signal line VRES/VRMP. Furthermore, in the fifth embodiment, two photoelectric converters in adjacent rows share one charge-voltage converter. More specifically, photoelectric converters PD1 and PD2 share the first charge-voltage converter fd1, and photoelectric converters PD3 and PD4 share the second charge-voltage converter fd2.

In read periods of the first to fourth rows, a bias voltage Vbias is supplied to the control electrode (gate) of a third transistor M3. In the first-row read period, the first voltage control signal φR1 for the first and second rows is activated to High level, and a reset voltage (a voltage lower than the initial voltage of the reference voltage) is supplied from the signal line VRES/VRMP. After that, the first voltage control signal φR1 is deactivated to Low level. In the period during which the first voltage control signal φR1 is activated to High level, the resetting of the first charge-voltage converter fd1 for the first and second rows is complete.

Then, the reference voltage VRMP is supplied to the signal line VRES/VRMP, and the second voltage control signal φR2 for the third and fourth rows is activated to High level. Consequently, the reference voltage VRMP is supplied to the second charge-voltage converter fd2 for the third and fourth rows. The reference voltage VRMP is linearly dropped, and a counter 144 (148) measures a time before a comparison result signal output from a signal processing unit 142 inverts due to the inversion of the magnitude relation between the reset voltage and reference voltage VRMP (N_AD). Subsequently, the reference voltage VRMP is returned to the initial voltage, and a transfer signal φT1 is activated to High level. As a consequence, charges photoelectrically converted and accumulated by the photoelectric converter PD1 in the first row are transferred to the first charge-voltage converter fd1. After the transfer signal φT1 is deactivated to Low level, the reference voltage VRMP is linearly dropped. Then, the counter 144 (148) measures a time before the comparison result signal output from the signal processing unit 142 inverts due to the inversion of the magnitude relation between the voltage of the first charge-voltage converter fd1 and the reference voltage VRMP (S_AD).

In the second-row readout period, the first voltage control signal φR1 for the first and second rows is activated to High level, and the reset voltage (a voltage lower than the initial voltage of the reference voltage) is supplied from the signal line VRES/VRMP. After that, the first voltage control signal φR1 is deactivated to Low level. In the period during which the first voltage control signal φR1 is activated to High level, the resetting of the first charge-voltage converter fd1 for the first and second rows is complete.

Then, the reference voltage VRMP is supplied to the signal line VRES/VRMP, and the second voltage control signal φR2 for the third and fourth rows is activated to High level. Consequently, the reference voltage VRMP is supplied to the second charge-voltage converter fd2 for the third and fourth rows. The reference voltage VRMP is linearly dropped, and the counter 144 (148) measures a time before the comparison result signal output from the signal processing unit 142 inverts due to the inversion of the magnitude relation between the reset voltage and reference voltage VRMP (N_AD). Subsequently, the reference voltage VRMP is returned to the initial voltage, and a transfer signal φT2 is activated to High level. As a consequence, charges photoelectrically converted and accumulated by the photoelectric converter PD2 in the second row are transferred to the first charge-voltage converter fd1. After the transfer signal φT2 is deactivated to Low level, the reference voltage VRMP is linearly dropped. Then, the counter 144 (148) measures a time before the comparison result signal output from the signal processing unit 142 inverts due to the inversion of the magnitude relation between the voltage of the charge-voltage converter fd and the reference voltage VRMP (S_AD).

In the third-row readout period, the second voltage control signal φR2 for the third and fourth rows is activated to High level, and the reset voltage (a voltage lower than the initial voltage of the reference voltage) is supplied from the signal line VRES/VRMP. After that, the second voltage control signal φR2 is deactivated to Low level. In the period during which the second voltage control signal φR2 is activated to High level, the resetting of the second charge-voltage converter fd2 for the third and fourth rows is complete.

Then, the reference voltage VRMP is supplied to the signal line VRES/VRMP, and the first voltage control signal φR1 for the first and second rows is activated to High level. Consequently, the reference voltage VRMP is supplied to the first charge-voltage converter fd1 for the first and second rows. The reference voltage VRMP is linearly dropped, and the counter 144 (148) measures a time before the comparison result signal output from the signal processing unit 142 inverts due to the inversion of the magnitude relation between the reset voltage and reference voltage VRMP (N_AD). Subsequently, the reference voltage VRMP is returned to the initial voltage, and a transfer signal φT3 is activated to High level. As a consequence, charges photoelectrically converted and accumulated by the photoelectric converter PD3 in the third row are transferred to the second charge-voltage converter fd2. After the transfer signal φT3 is deactivated to Low level, the reference voltage VRMP is linearly dropped. Then, the counter 144 (148) measures a time before the comparison result signal output from the signal processing unit 142 inverts due to the inversion of the magnitude relation between the voltage of the second charge-voltage converter fd2 and the reference voltage VRMP (S_AD).

In the fourth-row readout period, the second voltage control signal φR2 for the third and fourth rows is activated to High level, and the reset voltage (a voltage lower than the initial voltage of the reference voltage) is supplied from the signal line VRES/VRMP. After that, the second voltage control signal φR2 is deactivated to Low level. In the period during which the second voltage control signal φR2 is activated to High level, the resetting of the second charge-voltage converter fd2 for the third and fourth rows is complete.

Then, the reference voltage VRMP is supplied to the signal line VRES/VRMP, and the first voltage control signal φR1 for the first and second rows is activated to High level. Consequently, the reference voltage VRMP is supplied to the first charge-voltage converter fd1 for the first and second rows. The reference voltage VRMP is linearly dropped, and the counter 144 (148) measures a time before the comparison result signal output from the signal processing unit 142 inverts due to the inversion of the magnitude relation between the reset voltage and reference voltage VRMP (N_AD). Subsequently, the reference voltage VRMP is returned to the initial voltage, and a transfer signal φT4 is activated to High level. As a consequence, charges photoelectrically converted and accumulated by the photoelectric converter PD4 in the fourth row are transferred to the second charge-voltage converter fd2. After the transfer signal φT4 is deactivated to Low level, the reference voltage VRMP is linearly dropped. Then, the counter 144 (148) measures a time before the comparison result signal output from the signal processing unit 142 inverts due to the inversion of the magnitude relation between the voltage of the second charge-voltage converter fd2 and the reference voltage VRMP (S_AD).

In the fifth embodiment, two photoelectric converters share one charge-voltage converter. However, more photoelectric converters may also share one charge-voltage converter. The signal line VRES/VRMP may be connected to the charge-voltage converters in the same column via the reset switches MR, and may also be connected to all the charge-voltage converters via the reset switches MR. Accordingly, the signal line VRES/VRMP may be provided along the column direction, and may also be provided in a matrix along the row and column directions.

Figure 15:
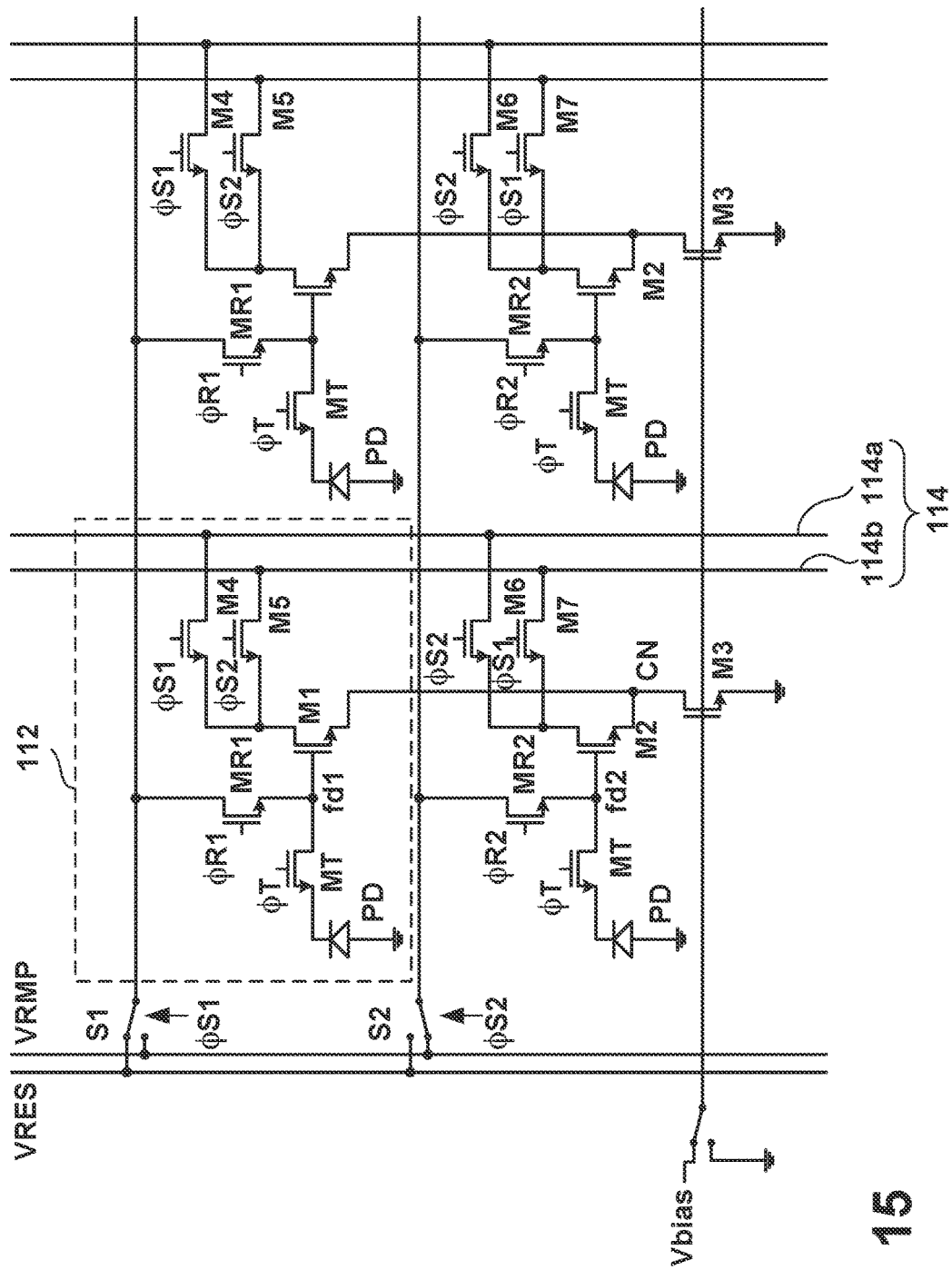
FIG. 15 is a view showing the arrangement of an image sensing unit of a solid-state image sensor according to the sixth embodiment of the present invention.

FIG. 15 shows the arrangement of an image sensing unit 110 of a solid-state image sensor of the sixth embodiment. In the sixth embodiment, switches M4 and M5 which are opened and closed under the control of φS1 and φS2 are added between a first transistor M1 and first vertical signal line 114a. Also, switches M6 and M7 which are opened and closed under the control of φS2 and φS1 are added between a second transistor M2 and second vertical signal line 114b. In the sixth embodiment, it is possible to transmit a signal corresponding to a noise level and optical signal via the first vertical signal line 114a, and transmit a signal corresponding to a reference voltage VRMP via the second vertical signal line 114b, regardless of a row to be read out. Accordingly, it is unnecessary to switch operations of a signal processing unit 142 in accordance with a row to be read out.

Figure 16:
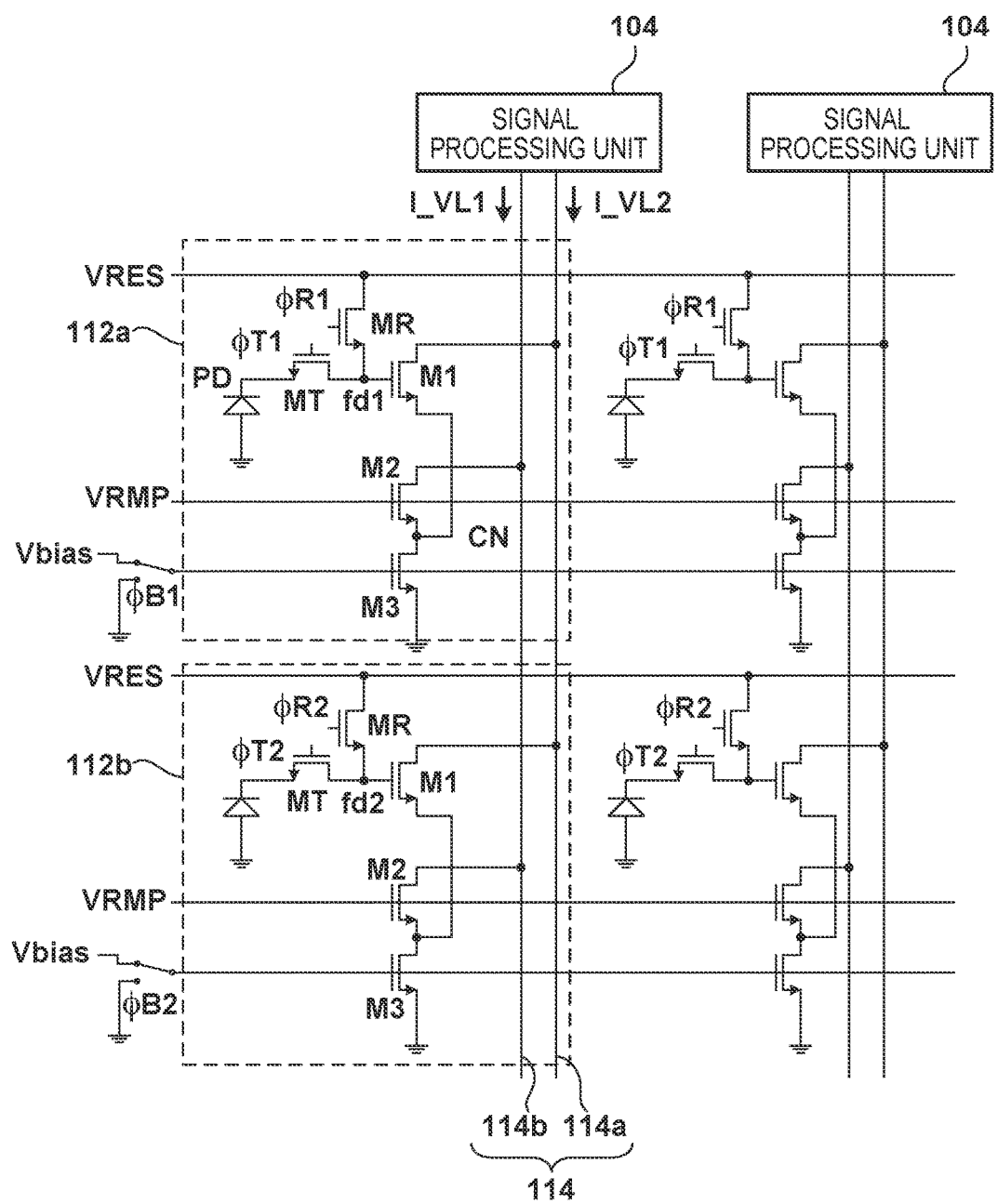
FIG. 16 is a view showing the first application example as an application example of the first embodiment shown in FIG. 4.

FIG. 16 shows the first application example as an application example of the first embodiment shown in FIG. 4. In the first application example, a signal processing unit 104 generates and outputs a signal (for example, a signal obtained by averaging a plurality of pixel signals) representing signals of at least two pixels 112a and 112b (at least two pixel blocks 113) belonging to different rows. When a signal is thus output by averaging a plurality of pixel signals, the effective number of pixels reduces, and the spatial resolution decreases, but a high-S/N image can be output at high speed, and this can be the merit of the system. The first application example is different from the first embodiment shown in FIG. 4 in that the switches controlled by the bias signals φB1 and φB2 are simultaneously connected to the Vbias side.

Figure 17:
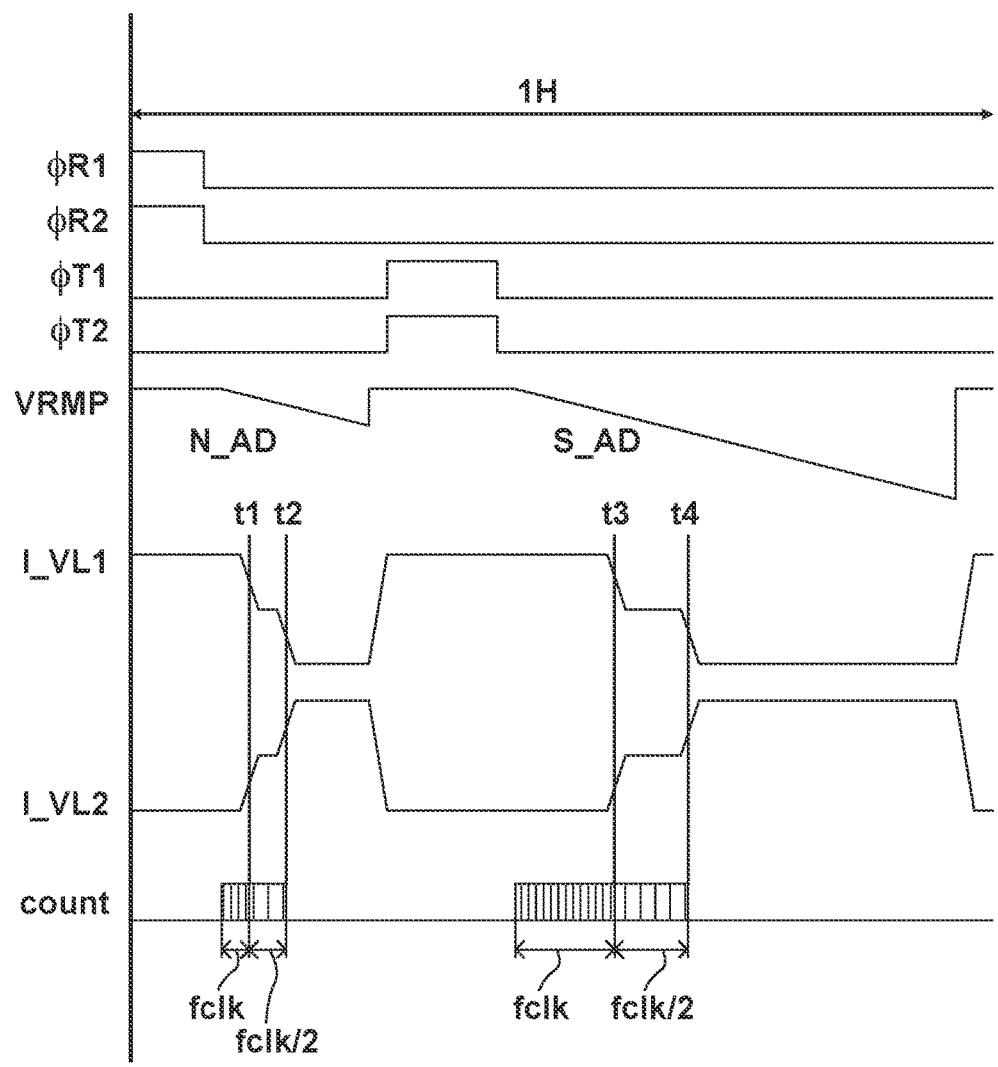
FIG. 17 is a view showing the operation of the first application example.

The operation of the first application example will be explained with reference to FIG. 17. When the voltage control signals φR1 and φR2 are simultaneously activated to High level, fd1 and fd2 are simultaneously reset to the reset voltage VRES. The reference voltage VRMP is supplied to the transistor M2. Then, N_AD is performed which changing the reference voltage VRMP. Subsequently, the transfer signals φT1 and φT2 are simultaneously activated to High level, and photoelectrically converted charges are transferred to the charge-voltage converters fd1 and fd2. Then, S_AD is performed while changing the reference signal VRMP. In each of the pixels 112a and 112b, the first and second transistors M1 and M2 form a differential signal line pair. The second main electrode of the first transistor M1 is connected to the first vertical signal line 114a, and the second main electrode of the second transistor M2 is connected to the second vertical signal line 114b. The current sources M3 of the pixels 112a and 112b are simultaneously activated. The current sources M3 of the pixels 112a and 112b have the same structure. Values I_VL1 and I_VL2 of electric currents flowing through the vertical signal lines 114a and 114b can change as shown in, for example, FIG. 17.

Details will be explained below. In N_AD and S_AD, the initial voltage of the reference voltage VRMP is controlled to be higher than voltages Vfd1 and Vfd2 of the charge-voltage converters fd1 and fd2, that is, controlled such that VRMP>Vfd1 and VRMP>Vfd2. As a result, in the pixels 112a and 112b, the second transistors M2 are turned on, and the first transistors M1 are turned off. Accordingly, the electric current I_VL1 flowing through the vertical signal line 114a is the sum of electric currents flowing through the current sources M3 of the two pixels 112a and 112b. Also, the electric current I_VL2 flowing through the vertical signal line 114b is 0.

Subsequently, ramp-down of the reference voltage VRMP is started, and VRMP<Vfd1 holds at time 1 in N_AD and at time t3 in S_AD. In the pixel 112a, therefore, M1 is turned on, M2 is turned off, I_VL1 reduces, and I_VL2 increases. In addition, when VRMP<Vfd2 holds at time t2 in N_AD and at time t4 in S_AD, M1 is turned on, M2 is turned off, and I_VL2 further reduces to 0 in the pixel 112b. Consequently, I_VL2 further increases and becomes the sum of the electric currents flowing through the current sources M3 of the two pixels 112a and 112b.

The signal processing unit 104 detects changes in electric currents I_VL1 and/or I_VL2, thereby detecting times t1 and t2 in the N_AD period and times t3 and t4 in the S_AD period. Letting fclk be the frequency of the count clock in a period from the start of count by the counter 144 (148) to t1 or t3, the frequency of the count clock from t1 or t3 to t2 or t4 at which the count is terminated can be controlled to fclk/2. This makes it possible to obtain the average value of the signals of the pixels 112a and 112b. Although the frequency of the count clock is changed in the first application example, the substance of the first application example is to detect times t1, t2, t3, and t4, so changing the count clock frequency is merely an example. For example, it is also possible to use two counters which operate by count clocks having the same frequency, output, as digital codes, a period from the start of count to t1 or t3 and a period from the start of count to t2 or t4, and add these codes by digital addition.

Figure 18:
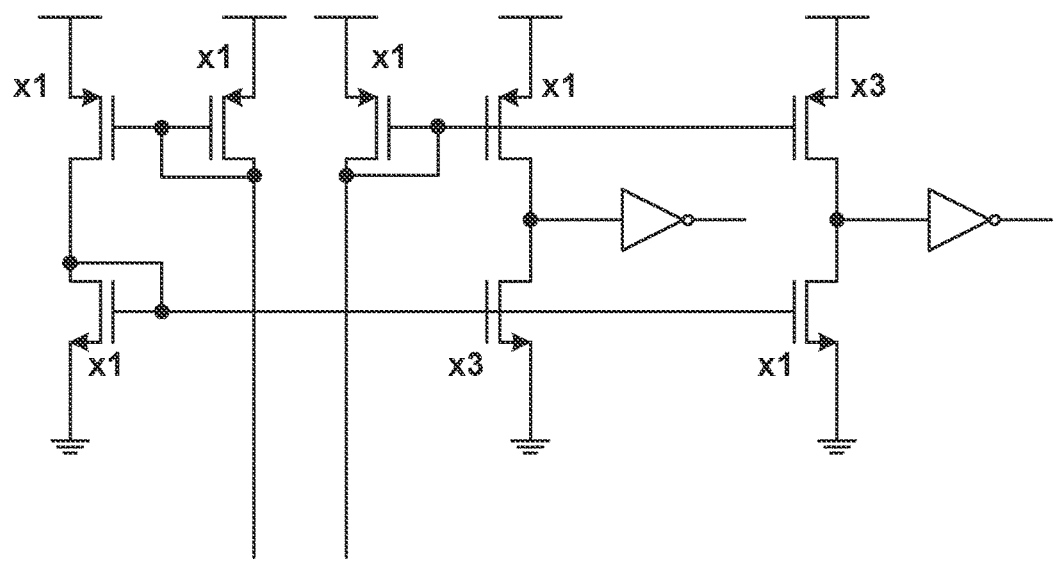
FIG. 18 is a view showing an arrangement example of a signal processing unit in the first application example.

FIG. 18 shows one arrangement example of the signal processing unit 142 according to the first application example. By setting the current mirror ratio as exemplified in FIG. 18, current changes can be detected by two different thresholds. The detection results are output from two inverters shown in FIG. 18.

Figure 19:
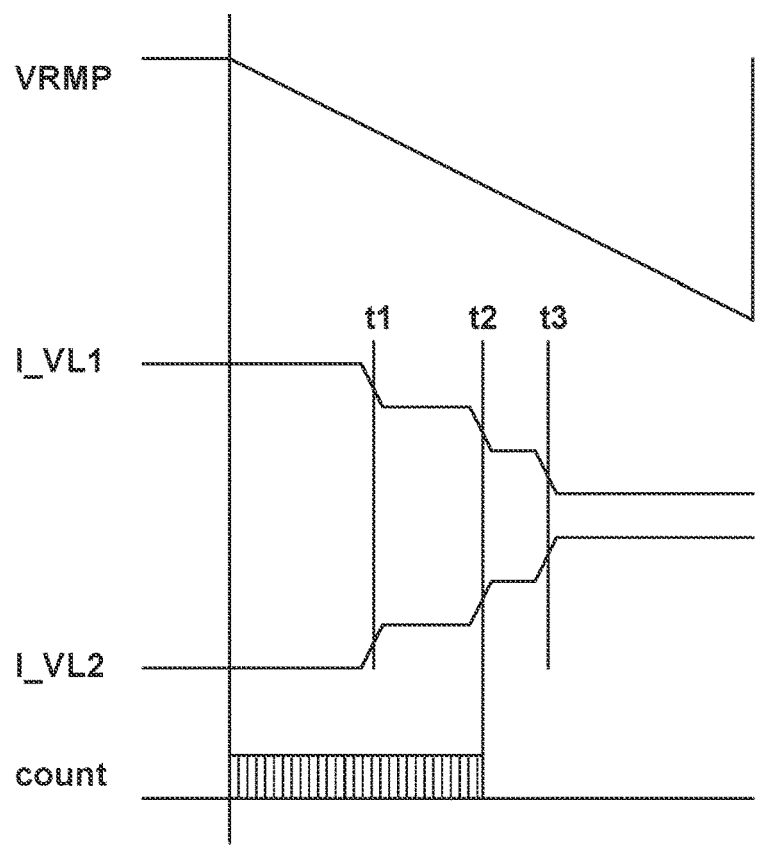
FIG. 19 is a view showing another operation of the first application example.

FIG. 19 shows an example in which a signal indicating a median value is generated from a plurality of pixel signals as a signal representing the plurality of signals. Referring to FIG. 19, an example in which a signal indicating the median value of signals of three pixels (112a, 112b, and 112c) is output is provided. The current sources M3 of the pixels 112a, 112b, and 112c have the same structure. FIG. 19 shows only a period during which the reference voltage VRMP is linearly dropped. As exemplified in FIG. 19, three change points t1, t2, and t3 appear in I_VL1 and I_VL2. To obtain a signal indicating the median value of the signals of the three pixels, counting need only be stopped at t2, so an intermediate threshold need only be set to be able to detect t2. The example in which a signal indicating the median value of signals of three pixels is generated has been explained, but the median value can easily be obtained for a larger number of pixels.

Figure 20:
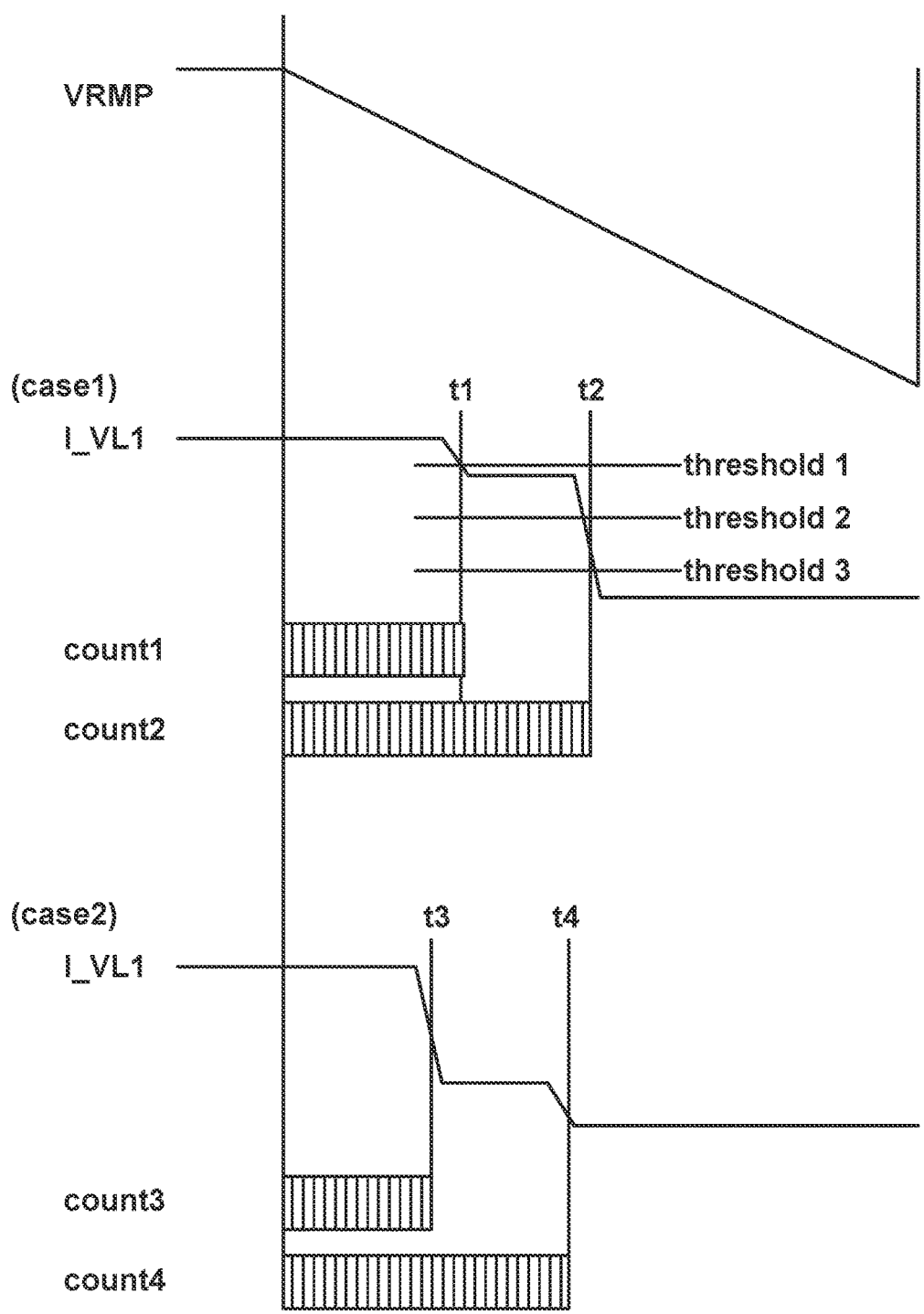
FIG. 20 is a view for explaining still another operation of the first application example.

FIG. 20 shows an example in which signals of two pixels are simultaneously read out and A/D conversion is performed on each signal. Assume that the magnitudes (current values) of the current sources M3 of the two pixels 112a and 112b shown in FIG. 16 are different, and M3 of pixel 112a>M3 of pixel 112b holds. FIG. 20 shows only a period during which the reference voltage VRMP is linearly dropped. A change in I_VL1 is (case1) or (case2) shown in FIG. 20 due to the magnitude relation between the signals of the pixels 112a and 112b (that is, the magnitude relation between the voltages Vfd1 and Vfd2).

(Case1) is a case in which Vfd1<Vfd2. The reference voltage VRMP starts linearly dropping. First, at time t1 at which VRMP<Vfd2, in the pixel 112b shown in FIG. 16, M1 is turned on, M2 is turned off, and I_VL1 reduces by the magnitude of the current source M3 of the pixel 112b. Since M3 of pixel 112a>M3 of pixel 112b, the reduction amount of the electric current is relatively small. Subsequently, at time t2 at which VRMP<Vfd1, in the pixel 112a shown in FIG. 16, M1 is turned on, M2 is turned off, and I_VL1 reduces by the magnitude of the current source M3 of the pixel 112a. Since M3 of pixel 112a>M3 of pixel 112b, the reduction amount of the electric current is relatively large.

(Case2) is a case in which Vfd1>Vfd2. The reference voltage VRMP starts linearly dropping. First, at time t3 at which VRMP<Vfd1, in the pixel 112a shown in FIG. 16, M1 is turned on, M2 is turned off, and I_VL1 reduces by the magnitude of M3 of the pixel 112a. Since M3 of pixel 112a>M3 of pixel 112b, the reduction amount of the electric current is relatively large. Subsequently, at time t4 at which VRMP<Vfd2, in the pixel 112b shown in FIG. 16, M1 is turned on, M2 is turned off, and I_VL1 reduces by the magnitude of the current source M3 of the pixel 112b. Since M3 of pixel 112a>M3 of pixel 112b, the reduction amount of the electric current is relatively small.

By detecting the current change by the three thresholds (thresholds 1, 2, and 3) exemplified in FIG. 20, whether fd1 or fd2 is determined can be detected. That is, in (case1), it is possible to determine that time t1 (count1) corresponds to fd2 of the pixel 112b, and time t2 (count2) corresponds to fd1 of the pixel 112a. In (case2), it is possible to determine that time t3 (count3) corresponds to fd1 of the pixel 112a, and time t4 (count4) corresponds to fd2 of the pixel 112b. Accordingly, it is possible to individually obtain the A/D-converted values of two pixels in one A/D period.

Figure 21:
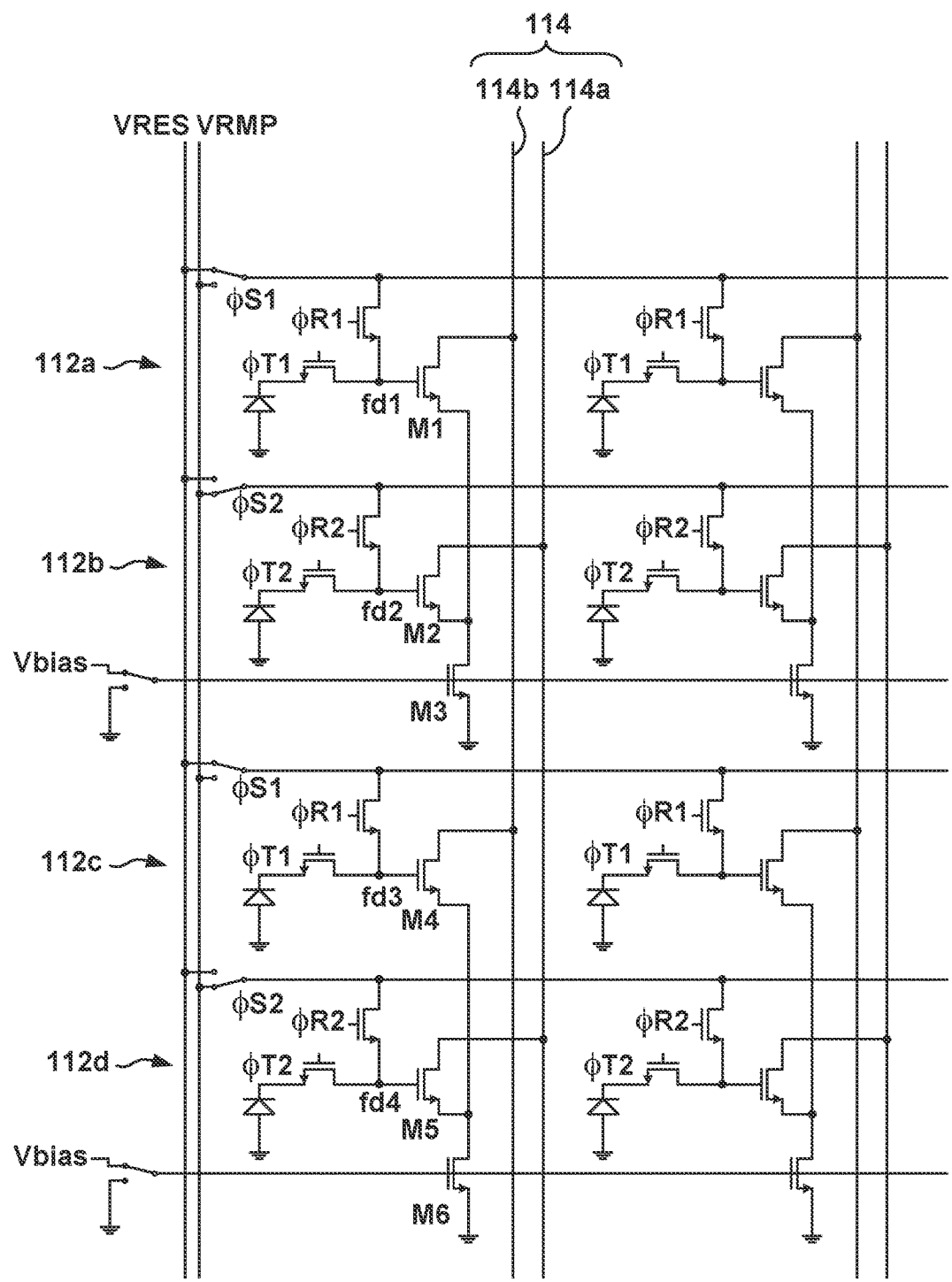
FIG. 21 is a view showing the second application example as an application example of the fourth embodiment shown in FIG. 11.

FIG. 21 shows the second application example as an application example of the fourth embodiment shown in FIG. 11. In the second application example, one signal obtained from a plurality of pixels 112a, 112b, 112c, and 112d belonging to different rows (for example, a signal obtained by averaging signals of a plurality of pixels) is read out. Referring to FIG. 21, M1 and M2 form one differential signal pair, and M4 and M5 form one differential signal pair. The drains of M1 and M4 are connected to the vertical signal line 114b, and the drains of the M2 and M5 are connected to the vertical signal line 114a. Current sources M3 and M6 are simultaneously activated.

Figure 22:
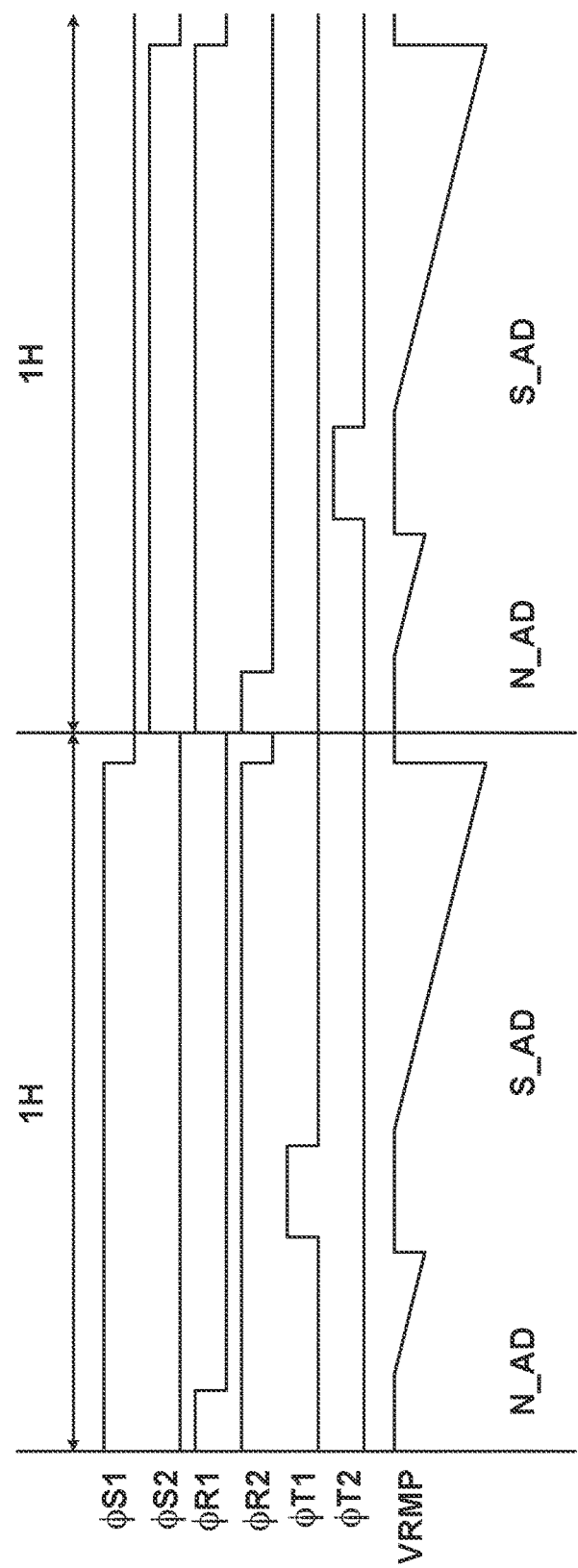
FIG. 22 is a view showing the operation of the second application example.

The operation of the second application example will be explained with reference to FIG. 22. In a first period (1H), φS1 and φR2 are controlled to High, φS2 is controlled to Low. Accordingly, the reference voltage VRMP is supplied to M2 and M5, and signals of fd1 and fd3 are simultaneously read out. Subsequently, in a second period (1H), in a second period (1H), φS2 and φR1 are controlled to High, and φS1 is controlled to Low. Accordingly, the reference voltage VRMP is supplied to M1 and M4, and signals of fd2 and fd4 are simultaneously read out.

Figure 23:
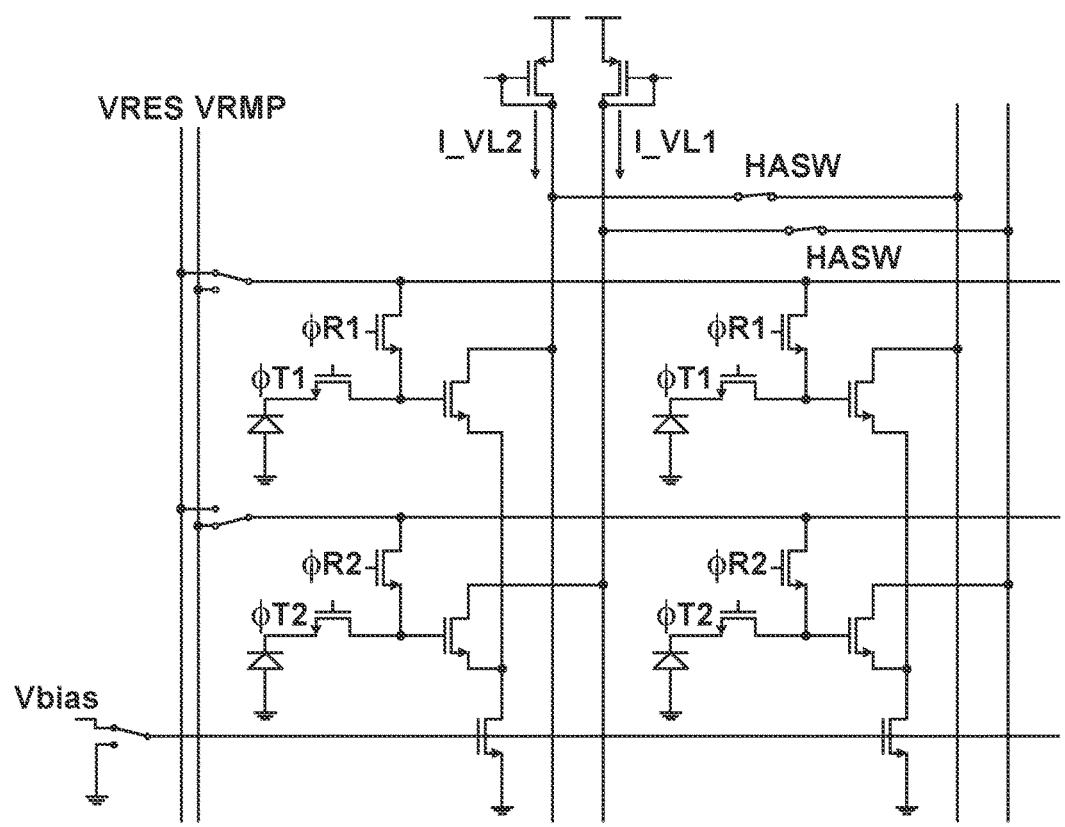
FIG. 23 is a view showing the third application example as another application example of the fourth embodiment shown in FIG. 11.

FIG. 23 shows the third application example as another application example of the fourth embodiment shown in FIG. 11. In the arrangements shown in FIGS. 16 and 21, signals of pixels adjacent to each other in the vertical direction are simultaneously processed. In the third application example, a plurality of vertical signal lines are connected via switches HASW, and signals of pixels adjacent to each other in the horizontal direction are simultaneously processed.

Figure 24:
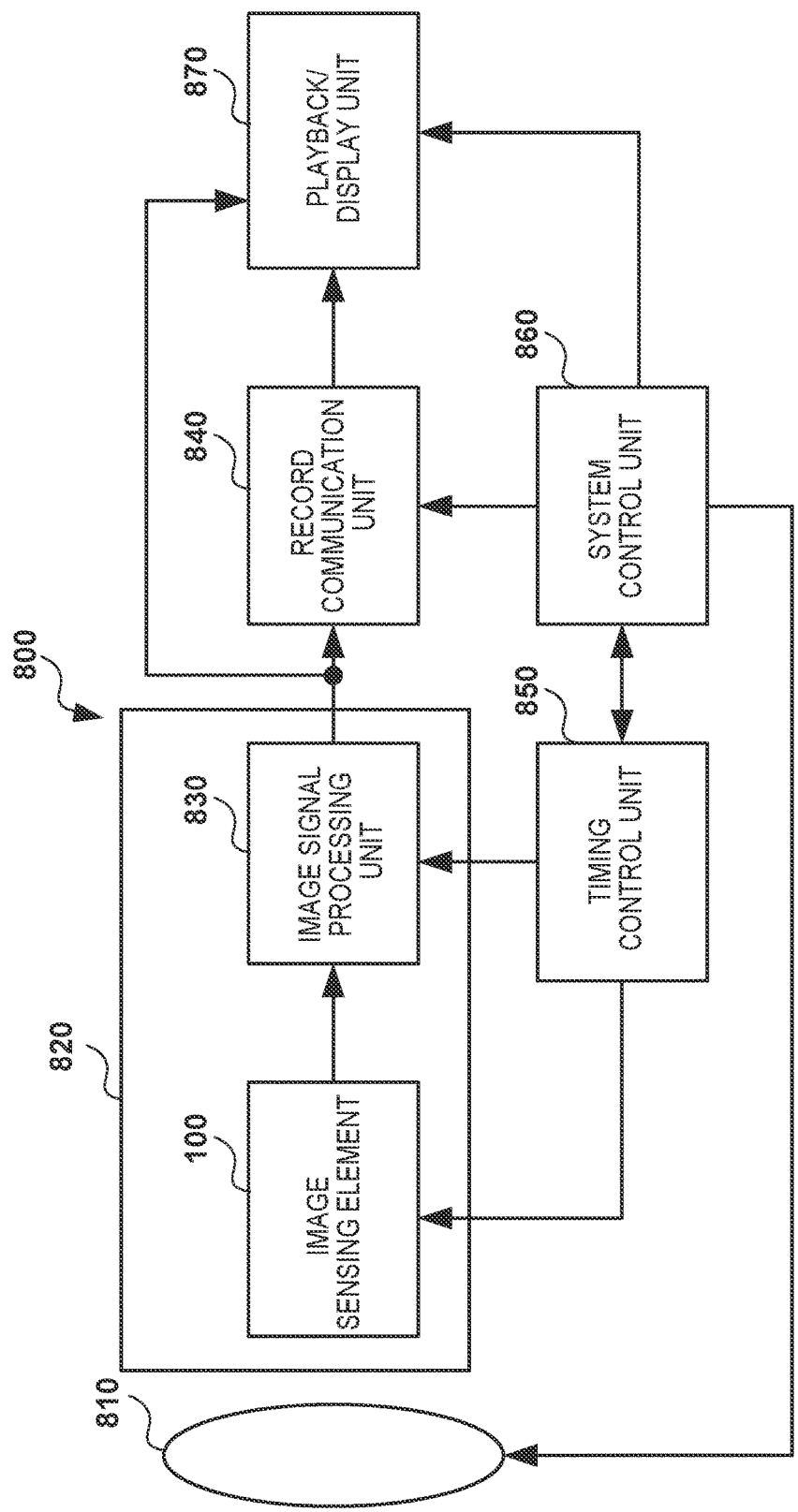
FIG. 24 is a view showing the arrangement of an image sensing system as an embodiment of the present invention.

FIG. 24 shows the arrangement of an image sensing system of one embodiment of the present invention. An image sensing system 800 includes an optical unit 810, image sensing element 100, image signal processing unit 830, record/communication unit 840, timing control unit 850, system control unit 860, and playback/display unit 870. An image sensing unit 820 includes the image sensing element 100 and image signal processing unit 830. The image sensing element 100 is a solid-state image sensor represented by the solid-state image sensors 1 and 1' explained in the above-mentioned embodiments.

The optical unit 810 as an optical system such as a lens images light from an object on an image sensing unit 110 of the image sensing element 100, in which a plurality of pixels are two-dimensionally arranged, thereby forming an image of the object. The image sensing element 100 outputs a signal corresponding to the light imaged on the image sensing unit 110, at a timing based on a signal from the timing control unit 850. The output signal from the image sensing element 100 is input to the image signal processing unit 830 as an image signal processor, and the image signal processing unit 830 performs signal processing in accordance with a method determined by a program or the like. The signal obtained by the processing in the image signal processing unit 830 is transmitted as image data to the record/communication unit 840. The record/communication unit 840 transmits a signal for forming an image to the playback/display unit 870, and causes the playback/display unit 870 to playback/display a moving image or still image. When receiving the signal from the image signal processing unit 830, the record/communication unit 840 communicates with the system control unit 860, and also records a signal for forming an image on a recording medium (not shown).

The system control unit 860 comprehensively controls the operation of the image sensing system, and controls the driving of the optical unit 810, timing control unit 850, record/communication unit 840, and playback/display unit 870. Also, the system control unit 860 includes a storage device (not shown) such as a recording medium, and records, for example, programs necessary to control the operation of the image sensing system in the storage device. Furthermore, the system control unit 860 supplies, for example, a signal for switching driving modes in accordance with a user's operation to the image sensing system. Practical examples are a change of a read target row or reset target row, a change of the angle of view caused by electronic zooming, and a shift of the angle of view caused by electronic vibration isolation. The timing control unit 850 controls the driving timings of the image sensing element 100 and image signal processing unit 830 under the control of the system control unit 860.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-066812, filed Mar. 27, 2014, and Japanese Patent Application No. 2014-265780, filed Dec. 26, 2014, which are hereby incorporated by reference herein in their entirety.

What is claimed is:

1. A solid-state image sensor comprising:
   a first signal line;
   a second signal line;
   a first pixel including a first photoelectric converter and a first transistor;
   a second pixel including a second photoelectric converter and a second transistor, a first main electrode of the first transistor and a first main electrode of the second transistor being connected to a common node;
   a current source provided in a path between the common node and a predetermined voltage; and
   a readout unit connected to a second main electrode of the first transistor via one of the first signal line and second signal line and connected to a second main electrode of the second transistor via the other one of the first signal line and the second signal line,
   wherein the readout unit reads out a signal from the first photoelectric converter in a first period during which a voltage corresponding to charges generated in the first photoelectric converter is supplied to a control electrode of the first transistor, and a ramp signal is supplied to a control electrode of the second transistor, and
   wherein the readout unit reads out a signal from the second photoelectric converter in a second period during which a voltage corresponding to charges generated in the second photoelectric converter is supplied to the control electrode of the second transistor, and a ramp signal is supplied to the control electrode of the first transistor.

2. The sensor according to claim 1, wherein the readout unit is configured to read out signals from the first and second photoelectric converters by comparing values of electric currents flowing through the first and the second signal lines.

3. The sensor according to claim 1, further comprising a third transistor having a first main electrode and a second main electrode connected to the control electrode of the first transistor,
   wherein one of a ramp signal and a reference signal is selectively supplied to the first main electrode of the third transistor.

4. The sensor according to claim 3, wherein a potential of the control electrode of the first transistor is reset by turning on the third transistor while the reference signal is supplied to the first main electrode of the third transistor.

5. The sensor according to claim 3, further comprising a fourth transistor having a first main electrode and a second main electrode connected to the control electrode of the second transistor,
   wherein one of a ramp signal and a reference signal is selectively supplied to the first main electrode of the fourth transistor.

6. The sensor according to claim 5, wherein the first main electrode of the third transistor and the first main electrode of the fourth transistor are connected to a common node to which one of the ramp signal and the reference signal is selectively supplied.

7. The sensor according to claim 5, wherein a potential of the control electrode of the first transistor is reset by turning on the third transistor while the reference signal is supplied to the first main electrode of the third transistor, and
   a potential of the control electrode of the second transistor is reset by turning on the fourth transistor while the reference signal is supplied to the first main electrode of the fourth transistor.

8. The sensor according to claim 1, wherein
   the first pixel further includes a first transfer transistor connected to the first photoelectric converter and the control electrode of the first transistor, a third photoelectric converter, and a second transfer transistor connected to the third photoelectric converter and the control electrode of the first transistor, and
   the second pixel further includes a third transfer transistor connected to the second photoelectric converter and the control electrode of the second transistor, a fourth photoelectric converter, and a fourth transfer transistor connected to the fourth photoelectric converter and the control electrode of the second transistor.

9. The sensor according to claim 5, wherein
   the first pixel further includes a first transfer transistor connected to the first photoelectric converter and the control electrode of the first transistor, a third photoelectric converter, and a second transfer transistor connected to the third photoelectric converter and the control electrode of the first transistor, and
   the second pixel further includes a third transfer transistor connected to the second photoelectric converter and the control electrode of the second transistor, a fourth photoelectric converter, and a fourth transfer transistor connected to the fourth photoelectric converter and the control electrode of the second transistor.

10. The sensor according to claim 9, wherein the second main electrode of the third transistor is connected to the first transfer transistor and the second transfer transistor, and the second main electrode of the fourth transistor is connected to the third transfer transistor and the fourth transfer transistor.

11. The sensor according to claim 1, wherein the readout unit is configured to generate a signal representing signals from the first and second pixels.

12. The sensor according to claim 11, wherein the signal representing signals from the first and second pixels is a signal having one of an average value and a median value of the signals from the first and second pixels.

13. An image sensing system comprising:

a solid-state image sensor cited in claim 1; and a processing unit configured to process a signal from the solid-state image sensor.

* * * * *